United States Patent [19]
Nakazawa

[11] Patent Number: 5,615,099
[45] Date of Patent: Mar. 25, 1997

[54] CONTROL SYSTEM FOR SINGLE-PHASE PWM CONVERTER

[75] Inventor: Yooske Nakazawa, Tokyo, Japan

[73] Assignee: Kabushiki Kaisha Toshiba, Kawasaki, Japan

[21] Appl. No.: 518,179

[22] Filed: Aug. 23, 1995

[30] Foreign Application Priority Data

Aug. 24, 1994 [JP] Japan .................................. 6-199704
Nov. 9, 1994 [JP] Japan .................................. 6-274952
Dec. 19, 1994 [JP] Japan .................................. 6-314902

[51] Int. Cl.$^6$ ............................ H02M 3/24; H02M 5/42; H02M 7/44
[52] U.S. Cl. .................................. 363/96; 363/41; 363/98
[58] Field of Search ........................... 363/41, 78, 96, 363/98; 318/811

[56] References Cited

U.S. PATENT DOCUMENTS

| | | | |
|---|---|---|---|
| 4,663,702 | 5/1987 | Tanaka | 363/65 |
| 4,860,186 | 8/1989 | Maekawa et al. | 363/41 |
| 5,021,936 | 6/1991 | Nishizawa et al. | 363/132 |
| 5,136,494 | 8/1992 | Akagi et al. | 363/98 |
| 5,373,223 | 12/1994 | Akage et al. | 363/98 |
| 5,446,647 | 8/1995 | Ikeda et al. | 363/89 |

*Primary Examiner*—Stuart N. Hecker
*Attorney, Agent, or Firm*—Oblon, Spivak, McClelland, Maier & Neustadt, P.C.

[57] ABSTRACT

A control system for a single-phase PWM converter composed of a plurality of power switching devices which converts an AC single-phase voltage to a DC voltage under PWM control. The control system includes a converter voltage reference operation unit for inputting a converter DC side voltage actual value, a converter DC side voltage reference value, a converter AC side current actual value, a power source voltage, and a power source voltage sine wave phase and for generating voltage references for respective phases, and a triangular wave generation unit for generating a triangular wave, such that when the power source voltage sine wave phase is in a phase wherein a magnitude of a converter AC side current reference value is small a frequency of the triangular wave is low, and when the power source voltage sine wave phase is in a phase wherein the magnitude of the converter AC side current reference value is large a frequency of the triangular wave is high. The control system further includes a triangular wave comparison unit for comparing the voltage references and the triangular wave to generate PWM signals for respective phases. Each of the PWM signals is applied to one of the power switching devices in the single-phase PWM converter to PWM control the single-phase PWM converter, respectively.

11 Claims, 25 Drawing Sheets

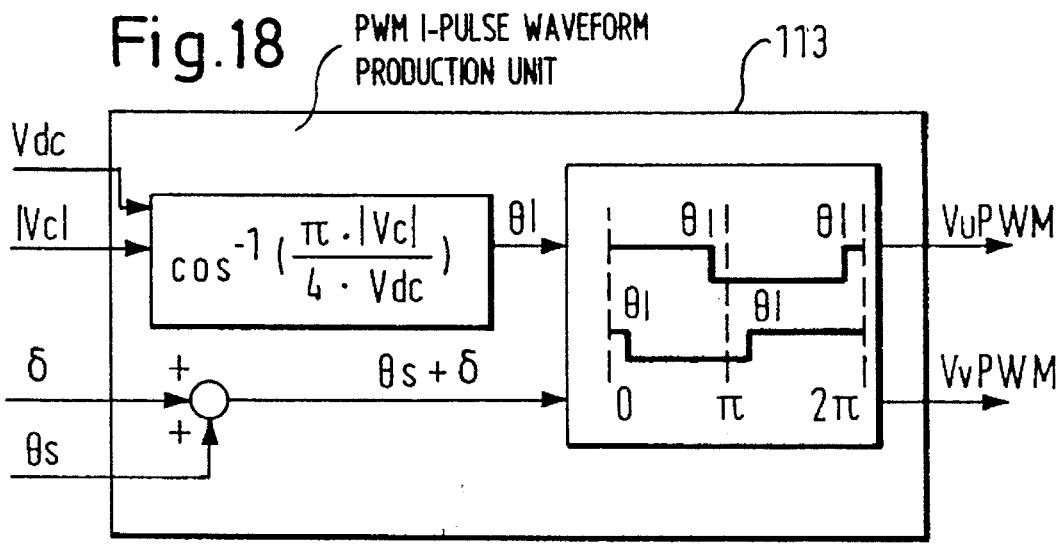
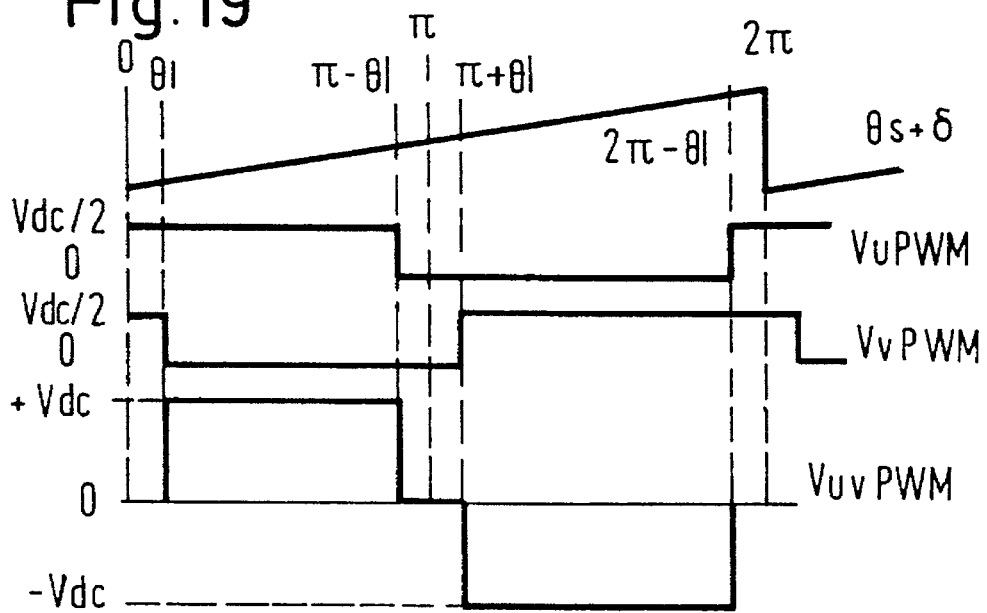

5,615,099

CONTROL SYSTEM FOR SINGLE-PHASE PWM CONVERTER

BACKGROUND OF THE INVENTION

1. Field of the Invention

This invention relates to a control system for a single-phase pulse-width modulation (hereinafter stated as PWM) converter, and more particularly to a control system for a single-phase PWM converter which converts AC single-phase voltage to DC voltage under PWM control.

2. Description of the Related Art

In a conventional single-phase PWM converter control system, the modulation frequency of pulse-width modulation was constant. As shown in FIG. 28, this was because a triangular wave generation unit 2 for pulse-width modulation was composed of a constant frequency triangular wave generation unit 29.

In order to improve efficiency of the PWM converter and design miniaturization of radiators by reducing the PWM converter switching loss while keeping the modulation frequency of pulse-width modulation constant, it is effective to set the PWM converter modulation frequency to a low value. However, if the switching frequency is set low, the ripple of the converter AC side current will become larger and exceed the peak turn-off current of the PWM converter switching devices (such as GTOs: gate turn-off thyristors). Therefore, the addition of a current smoothing reactor or the like will be required, thus making the system bulkier.

As shown in FIG. 29, a prior art single-phase PWM converter control system 101 was composed of a DC link voltage control unit 111, a converter voltage reference operation unit 112 and a triangular wave comparison unit 122. A DC link voltage reference value VdcRef and a DC link voltage actual value Vdc were inputted to DC link voltage control unit 111. It obtained a converter AC side current amplitude |Is| from their deviation and applied that to converter voltage reference operation unit 112. Converter voltage reference operation unit 112 obtained a converter power source voltage reference value Vc by inputting converter AC side current amplitude |Is|, an AC voltage actual value Vs and an AC current actual value Is. It was designed then to perform pulse-width modulation by inputting converter power source voltage reference value Vc and a power source voltage sine wave phase θs to triangular wave comparison unit 122.

That is to say, the pulse-width modulation of this single-phase PWM converter was performed by the triangular wave comparison between a high-frequency (about 500 Hz) triangular wave, 7–9 times higher than the AC power source voltage frequency (50–60 Hz).and the converter voltage reference value.

However, in such a prior art single-phase PWM converter control system, the current harmonics due to PWM converter switching resulted in electromagnetic noise in the AC power source transformer. In particular, in the case of a prior art PWM converter in which the switching frequency was about 500 Hz, 1 kHz–4 kHz noise, which is the most unpleasant sense of hearing, became greater.

Also, the lower the PWM converter/inverter DC link voltage was, the smaller the electromagnetic noise generated from the AC power source transformer and the motor which was the inverter load became. However, in the prior art triangular wave comparison PWM method, due to the limitation of the minimum ON time of a power switching device such as a GTO, the DC link voltage could not be set below a specified value determined from amplitude of the AC power source voltage.

SUMMARY OF THE INVENTION

Accordingly, one object of this invention is to provide a control system for a single-phase PWM converter which can reduce the PWM converter switching loss without any additions such as current smoothing reactors.

Another object of this invention is to provide a control system for a single-phase PWM converter which can reduce the noise which is unpleasant to the sense of hearing.

Still another object of this invention is to provide a control system for a single-phase PWM converter which can set the DC link voltage lower than the specified value determined by the amplitude of the AC power source voltage, thereby to reduce the noise which is unpleasant to the sense of hearing.

These and other objects of this invention can be achieved by providing a control system for a single-phase PWM converter composed of a plurality of power switching devices which inputs an AC single-phase voltage, converts the AC single-phase voltage to a DC voltage under PWM control and outputs the DC voltage. The control system includes a converter voltage reference operation unit for inputting a converter DC side voltage actual value, a converter DC side voltage reference value, a converter AC side current actual value, a power source voltage, and a power source voltage sine wave phase and for generating voltage references for respective phases, and a triangular wave generation unit for inputting the power source voltage sine wave phase and for generating a triangular wave such that when the power source voltage sine wave phase is in a phase wherein a magnitude of a converter AC side current reference value is small a frequency of the triangular wave is low and when the power source voltage sine wave phase is in a phase wherein the magnitude of the converter AC side current reference value is large a frequency of the triangular wave is high. The control system further includes a triangular wave comparison unit connected to receive the triangular wave and the voltage references for comparing the voltage references and the triangular wave to generate PWM signals for respective phases. Each of the PWM signals is applied to one of the power switching devices in the single-phase PWM converter to PWM control the single-phase PWM converter, respectively.

According to one aspect of this invention, there can be achieved by providing a control system for a single-phase PWM converter composed of a plurality of power switching devices which inputs an AC single-phase voltage, converts the AC single-phase voltage to a DC voltage under PWM control and outputs the DC voltage. The control system includes a converter voltage reference operation unit for inputting a converter DC side voltage actual value, a converter DC side voltage reference value, a converter AC side current actual value, a power source voltage, and a power source voltage sine wave phase and for generating voltage references for respective phases and a converter AC side current reference value, and a triangular wave generation unit connected to receive the power source voltage sine wave phase and the converter AC side current reference value for generating a triangular wave such that when a magnitude of the converter AC side current reference value is small a frequency of the triangular wave is low and when the magnitude of the converter AC side current reference value is large a frequency of the triangular wave is high. The control system further includes a triangular wave comparison unit connected to receive the triangular wave and the voltage references for comparing the voltage references and the triangular wave to generate PWM signals for respective phases. Each of the PWM signals is applied to one of the power switching devices in the single-phase PWM converter to PWM control the single-phase PWM converter, respectively.

According to another aspect of this invention, there can be achieved by providing a control system for a single-phase PWM converter composed of a plurality of power switching devices which inputs an AC single-phase voltage, converts the AC single-phase voltage to a DC voltage under PWM control and outputs the DC voltage. The control system includes a converter voltage reference operation unit for inputting a converter DC side voltage actual value, a converter DC side voltage reference value, a converter AC side current actual value, a power source voltage, and a power source voltage sine wave phase and for generating voltage references for respective phases, and a triangular wave generation unit for inputting the power source voltage sine wave phase and for generating a triangular wave of a constant frequency in synchronism with the power source voltage sine wave phase. The control system further includes a voltage reference correction unit connected to receive the voltage references and the power source voltage sine wave phase for correcting the voltage references based on the power source voltage sine wave phase to generate as voltage reference corrected values for respective phases, and a triangular wave comparison unit connected to receive the triangular wave and the voltage reference corrected values for comparing the voltage reference corrected values and the triangular wave to generate PWM signals for respective phases. Each of the PWM signals is applied to one of the power switching devices in the single-phase PWM converter to PWM control the single-phase PWM converter, respectively.

According to still another aspect of this invention there can be achieved by providing a control system for a single-phase PWM converter composed of a plurality of power switching devices which inputs an AC single-phase voltage, converts the AC single-phase voltage to a DC voltage under PWM control and outputs the DC voltage. The control system includes a DC link voltage control unit for inputting a DC link voltage actual value of a DC side of the single-phase PWM converter and a DC link voltage reference value previously set, for generating a first amplitude of a current at an AC side of the single-phase PWM converter so that a deviation between the DC link voltage actual value and the DC link voltage reference value becomes small, and a converter voltage reference operation unit connected to receive the first amplitude and the AC single-phase voltage for generating a converter voltage reference based on the first amplitude and the AC single-phase voltage. The converter voltage reference includes a second amplitude of the converter voltage reference and a phase of the converter voltage reference which is a phase difference between the converter voltage reference and the AC single-phase voltage. The control system further includes a PWM one-pulse waveform production unit connected to receive the converter voltage reference, the DC link voltage actual value and a sine wave phase of the AC single-phase voltage for generating PWM signals for respective phases of a PWM one-pulse waveform synchronized with the phase of the converter voltage reference. The PWM one-pulse waveform includes one pulse of the PWM signal in a half-cycle of the AC single-phase voltage, each of the PWM signals is provided with a third amplitude of a basic frequency component of the PWM voltage reference equal to the second amplitude, and each of the PWM signals is applied to one of the power switching devices in the single-phase PWM converter to PWM control the single-phase PWM converter, respectively.

According to a further aspect of this invention there can be achieved by providing a control system for a single-phase PWM converter composed of a plurality of power switching devices which inputs an AC single-phase voltage, converts the AC single-phase voltage to a DC voltage under PWM control, outputs the DC voltage. An inverter is connected to the DC side of the single-phase PWM converter as a load. The control system includes a DC link voltage setting unit for inputting an output frequency of the inverter and a fourth amplitude of the AC single-phase voltage and for generating the DC link voltage reference value, such that when the output frequency is small the DC link voltage reference value is smaller than the fourth amplitude, and when the output frequency is large the DC link voltage reference value is larger than the fourth amplitude, and a DC link voltage control unit connected to receive the DC link voltage reference value and a DC link voltage actual value for generating a first amplitude of a current at an AC side of the single-phase PWM converter so that a deviation between the DC link voltage actual value and the DC link voltage reference value becomes small. The control system further includes a converter voltage reference operation unit connected to receive the first amplitude, the AC single-phase voltage, a sine wave phase of the AC single-phase voltage, and an actual value of a current at an input side of the single-phase PWM converter for generating a converter voltage reference and a triangular wave comparison unit connected to receive the converter voltage reference, the DC link voltage actual value and the sine wave phase of the AC single-phase voltage for comparing the converter voltage reference and a triangular wave of a constant frequency synchronized with the sine wave phase, having an amplitude determined by the DC link voltage actual value to generate PWM signals for respective phases. Each of the PWM signals is applied to one of the power switching devices in the single-phase PWM converter to PWM control the single-phase PWM converter, respectively.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 18 is a block diagram showing the composition of a PWM 1-pulse waveform production unit 113;

FIG. 19 is a waveform diagram to illustrate the operation of PWM 1-pulse waveform production unit 113;

DETAILED DESCRIPTION OF THE PREFERRED EMBODIMENTS

Figure 1A:
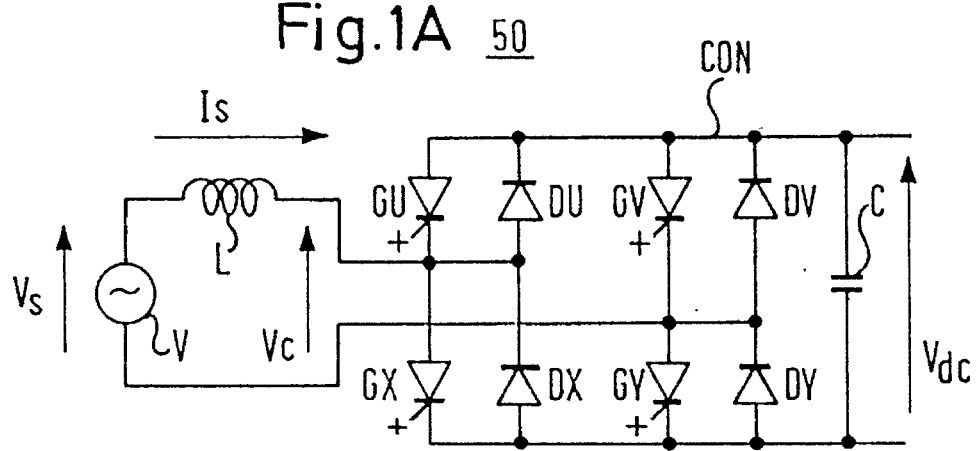
FIG. 1A is a circuit diagram showing a main circuit of a single-phase PWM converter to which this invention is applied.

Referring now to the drawings, wherein like reference numerals designate identical or corresponding parts throughout the several views, the embodiments of this invention will be described below.

Figure 1B:
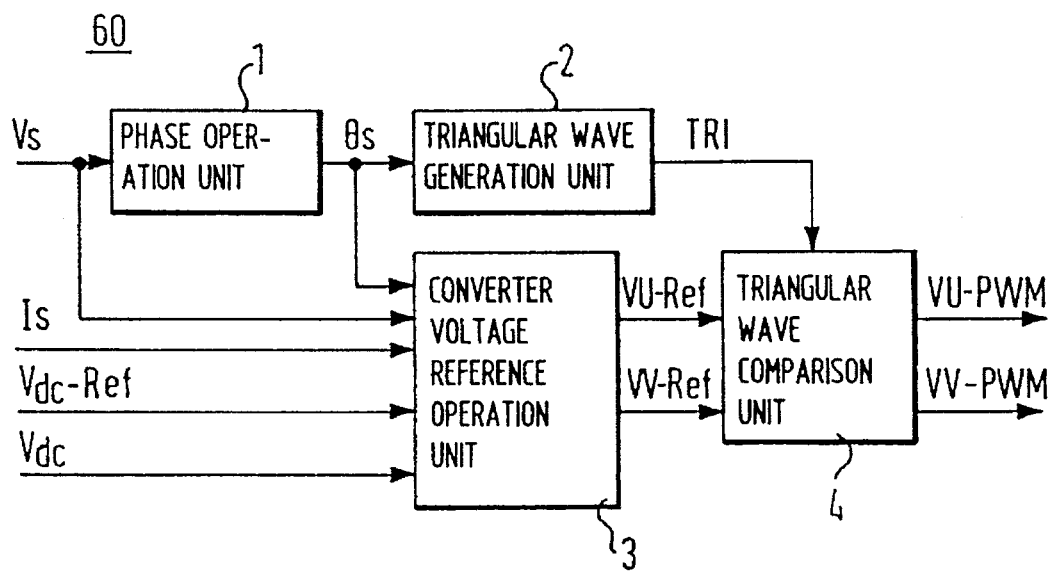
FIG. 1B is a block diagram showing a single-phase PWM converter control system according to a first embodiment this invention.

FIGS. 1A and 1B show a single-phase PWM converter control system according to a first embodiment of this invention. FIG. 1A shows a main circuit 50 of the single-phase PWM converter, and FIG. 1B shows its control system 60. This is an embodiment for the case when the system operates in so-called the 8-pulse PWM mode with eight pulses in a half-cycle of AC power source V.

As shown in FIG. 1A main circuit 50 is composed of a single-phase AC power source V, a reactor L, a capacitor C, and a converter CON composed of semiconductor devices having ON/OFF control terminals, for instance GTOs (gate turn-off thyristors) GU, GV, GX, GY, and diodes DU, DV, DX, DY each connected in parallel to one of semiconductor devices GU, GV, GX, GY, respectively.

As shown in FIG. 1B, control system 60 is composed of a phase operation unit 1, a triangular wave generation unit 2, a converter voltage reference operation unit 3 and a triangular wave comparison unit 4.

Figure 2:
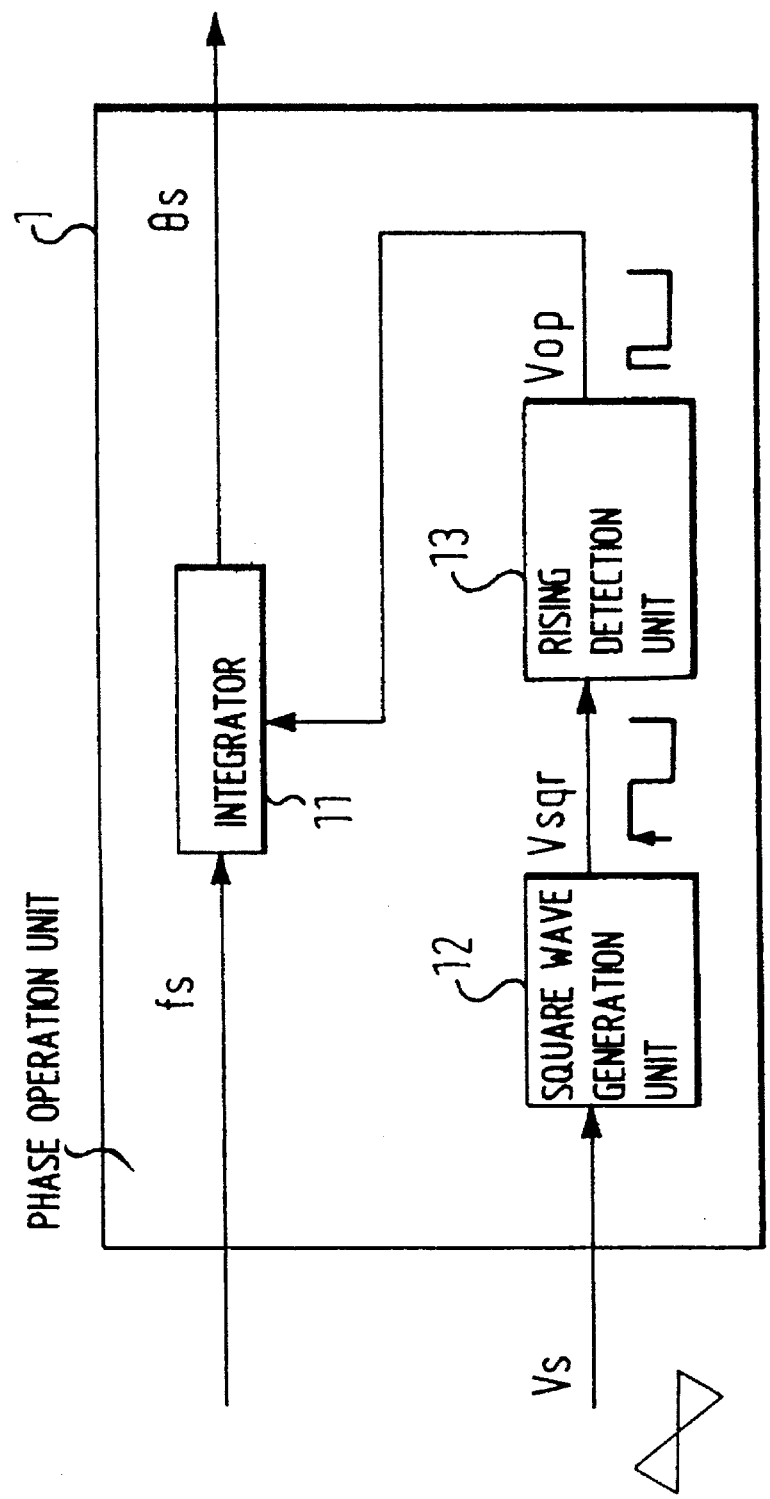
FIG. 2 is a block diagram showing the composition of a phase operation unit 1.

Phase operation unit 1 is composed, for instance, as shown in FIG. 2. It inputs a power source voltage Vs of single-phase AC power source V and calculates and outputs a power source voltage since wave phase θs.

Figure 3:
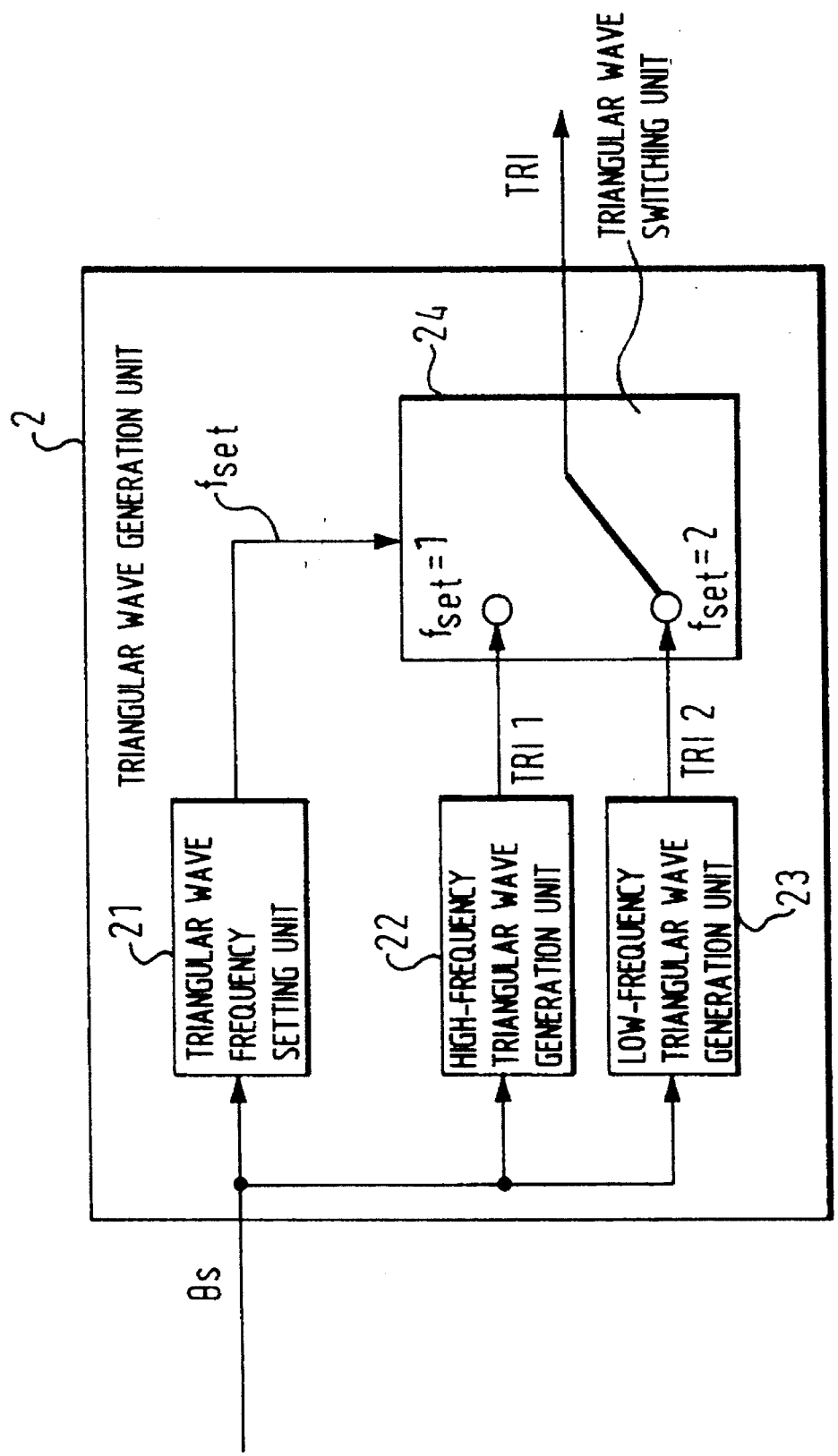
FIG. 3 is a block diagram showing the composition of a triangular wave generation unit 2.

Triangular wave generation unit 2 is composed, for instance, as shown in FIG. 3. It takes AC power source voltage sine wave phase θs as its input. It outputs a high-frequency or low-frequency triangular wave TRI in synchronization with this AC power source voltage sine wave phase θs.

Figure 4:
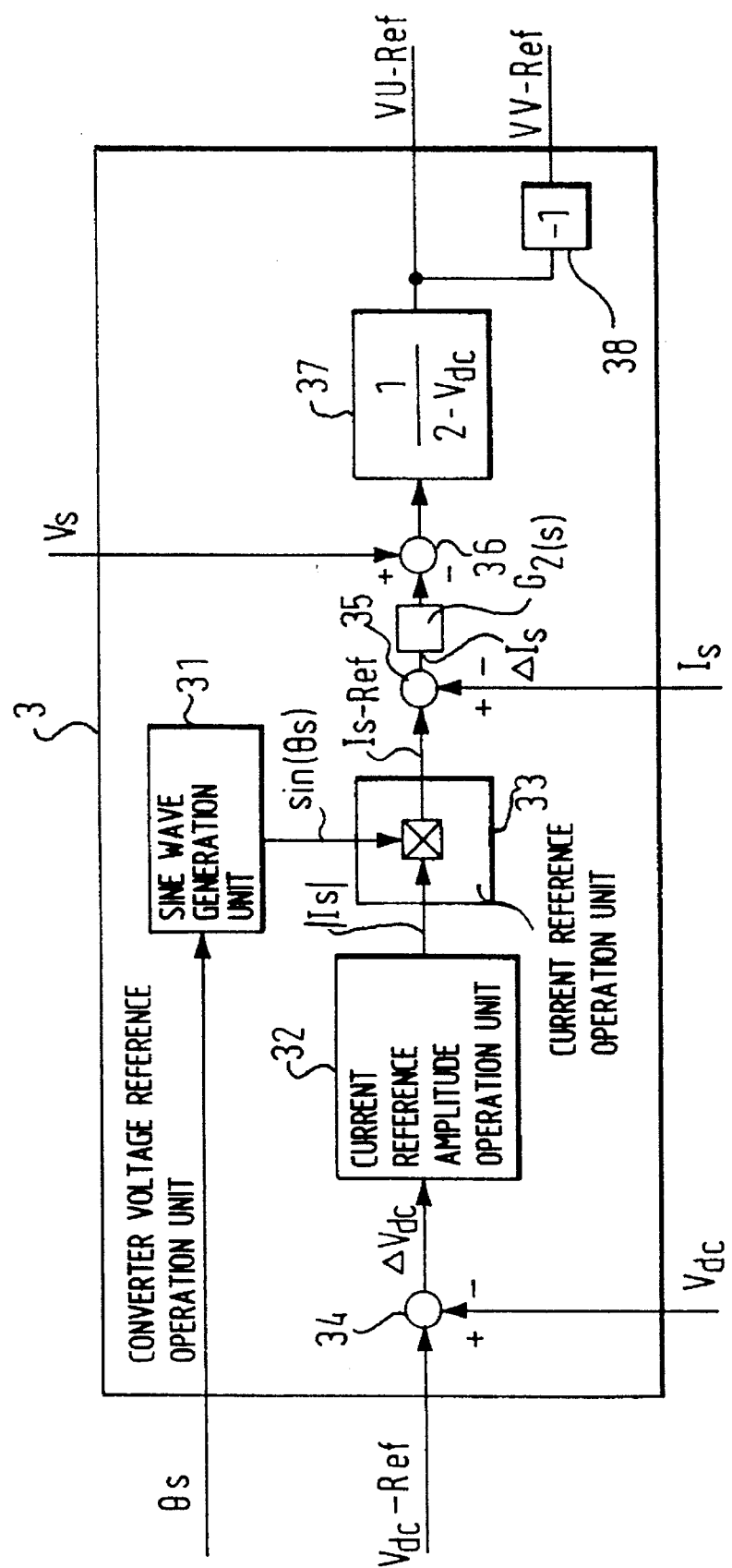
FIG. 4 is a block diagram showing the composition of a converter voltage reference operation unit 3.

Converter voltage reference operation unit 3 is composed, for instance, as shown in FIG. 4. It takes as its input AC power source voltage sine wave phase θs, power source voltage Vs, a converter AC side current actual value Is, a converter DC side voltage reference Vdc-Ref and a converter DC side voltage actual value Vdc. It executes a specified operation process and outputs a U-phase voltage reference VU-Ref and a V-phase voltage reference VV-Ref.

Triangular wave comparison unit 4 inputs triangular wave TRI which is the output of triangular wave generation unit 2, and U-phase voltage reference VU-Ref and V-phase voltage reference VV-Ref from converter voltage reference operation unit 3. It outputs a U-phase PWM signal VU-PWM and a V-phase PWM signal VV-PWM using a specified operation process. These PWM signals VU-PWM and VV-PWM are applied through gate circuits to respective semiconductor devices GU and GV in converter CON in order to PWM control converter CON. Though not shown in the drawings, PWM signals VX-PWM and VY-PWM for X and Y phases are generated using PWM signals VU-PWM and VV-PWM, and are applied through gate circuits to respective semiconductor devices GX and GY, respectively.

FIG. 2 is a block diagram showing the composition of phase operation unit 1. Phase operation unit 1 is composed of an integrator 11, a square wave production unit 12 and a rising detection unit 13.

Square wave production unit 12 takes as its input the waveform of power source voltage Vs, and produces a square wave Vsqr in response to the following conditional branching. That is to say, when $Vs \geq 0$, $Vsqr=1$, and when $Vs<0$, $vsqr=0$.

Rising detection unit 13 takes output Vsqr of square wave production unit 12 as its input, and produces and outputs a pulse Vop at the moment square wave Vsqr changes from "0" to "1".

Integrator 11 takes a power source frequency fs as its input, and executes the time integration of power source frequency fs. When output pulse Vop of rising detection unit 13 is inputted to integrator 11, it resets the integration value to zero and recommences time integration. It outputs the integration value as power source voltage sine wave phase θs.

FIG. 3 is a block diagram showing the composition of triangular wave generation unit 2. Triangular wave generation unit 2 is composed of a triangular wave frequency setting unit 21, a high-frequency triangular wave generation unit 22, a low-frequency triangular wave generation unit 23 and a triangular wave switching unit 24.

High-frequency triangular wave generation unit 22 takes AC power source voltage sine wave phase θs as its input. It generates and outputs a high-frequency triangular wave TRI1 in synchronization with this AC power source voltage sine wave phase θs.

Low-frequency triangular wave generation unit 23 takes AC power source voltage sine wave phase θs as its input. It generates and outputs a low-frequency triangular wave TRI2 in synchronization with this AC power source voltage sine wave phase θs.

Triangular wave frequency setting unit 21 takes AC power source voltage sine wave phase θs as its input. It outputs a triangular wave frequency setting signal fset to select either one of low-frequency triangular wave TRI2 or high-frequency triangular wave TRI1 in response to this AC power source voltage sine wave phase θs.

Triangular wave switching unit 24 takes as its inputs triangular wave frequency setting signal fset outputted from triangular wave frequency setting unit 21, high-frequency triangular wave TRI1 outputted from high-frequency triangular wave generation unit 22 and low-frequency triangular wave TRI2 outputted from low-frequency triangular wave generation unit 23. It outputs, as triangular wave TRI, triangular wave (TRI1 or TRI2) of the frequency set by triangular wave frequency setting signal fset.

The operation of triangular wave generation unit 2 composed in this way is described with reference to FIG. 1B, FIG. 3 and FIG. 5. Power source voltage Vs is taken as a sine wave of 50 Hz. Power source voltage sine wave phase as outputted from phase operation unit 1 is inputted to triangular wave generation unit 2. Normally, a single-phase PWM converter is controlled so that the power source power factor become 1. Therefore, power source voltage sine wave phase as is equal to the converter AC side current reference value phase.

High-frequency triangular wave generation unit 22 takes power source voltage sine wave phase θs as its input, and outputs constant frequency triangular wave TRI1, shown below, in response to power source voltage sine wave phase θs. The frequency of triangular wave TRI1 is nine times that of power source voltage Vs.

$0 \leq \theta_s < (1/18)\pi \rightarrow TRI1=(18/\pi)\theta_s$ $(1/18)\pi \leq \theta_s < (1/6)\pi \rightarrow TRI1=(-18/\pi)\theta_s+2$ $(1/6)\pi \leq \theta_s < (5/18)\pi \rightarrow TRI1=(18/\pi)\theta_s-4$ $(5/18)\pi \leq \theta_s < (7/18)\pi \rightarrow TRI1=(-18/\pi)\theta_s+6$ $(7/18)\pi \leq \theta_s < (1/2)\pi \rightarrow TRI1=(18/\pi)\theta_s-8$ $(1/2)\pi \leq \theta_s < (11/18)\pi \rightarrow TRI1=(-18/\pi)\theta_s+10$ $(11/18)\pi \leq \theta_s < (13/18)\pi \rightarrow TRI1=(18/\pi)\theta_s-12$ $(13/18)\pi \leq \theta_s < (5/6)\pi \rightarrow TRI1=(-18/\pi)\theta_s+14$ $(5/6)\pi \leq \theta_s < (17/18)\pi \rightarrow TRI1=(18/\pi)\theta_s-16$ $(17/18)\pi \leq \theta_s < \pi \rightarrow TRI1=(-18/\pi)\theta_s+18$ $\pi \leq \theta_s < (19/18)\pi \rightarrow TRI1=(18/\pi)\theta_s-18$ $(19/18)\pi \rightarrow \theta_s < (7/6)\pi \rightarrow TRI1=(-18/\pi)\theta_s+20$ $(7/6)\pi \leq \theta_s < (23/18)\pi \rightarrow TRI1=(18/\pi)\theta_s-22$ $(23/18)\pi \rightarrow \theta_s < (25/18)\pi \rightarrow TRI1=(-18/\pi)\theta_s+24$ $(25/18)\pi \leq \theta_s < (3/2)\pi \rightarrow TRI1=(18/\pi)\theta_s-26$ $(3/2)\pi \leq \theta_s < (29/18)\pi \rightarrow TRI1=(-18/\pi)\theta_s+28$ $(29/18)\pi \leq \theta_s < (31/18)\pi \rightarrow TRI1=(18/\pi)\theta_s-30$ $(31/18)\pi \leq \theta_s < (11/6)\pi \rightarrow TRI1=(-18/\pi)\theta_s+32$ $(11/6)\pi \leq \theta_s < (35/18)\pi \rightarrow TRI1=(18/\pi)\theta_s-34$ $(35/18)\pi \leq \theta_s < 2\pi \rightarrow TRI1=(-18/\pi)\theta_s+36$ Low-frequency triangular wave generation unit 23 takes power source voltage sine waved phase θs as its input, and outputs constant frequency triangular wave TRI2, shown below, in response to power source voltage sine wave phase θs. The frequency of triangular wave TRI2 is six times that of power source voltage Vs.

$0 \leq \theta_s < (1/6)\pi \rightarrow TRI2=(-12/\pi)\theta_s+1$ $(1/6)\pi \leq \theta_s < (1/3)\pi \rightarrow TRI2=(12/\pi)\theta_s-3$ $(1/3)\pi \leq \theta_s < (1/2)\pi \rightarrow TRI2=(-12/\pi)\theta_s+5$ $(1/2)\pi \leq \theta_s < (2/3)\pi \rightarrow TRI2=(12/\pi)\theta_s-7$ $(2/3)\pi \leq \theta_s < (5/6)\pi \rightarrow TRI2=(-12/\pi)\theta_s+9$ $(5/6)\pi \leq \theta_s < \pi \rightarrow TRI2=(12/\pi)\theta_s-11$ $\pi \leq \theta_s < (7/6)\pi \rightarrow TRI2=(-12/\pi)\theta_s+13$ $(7/6)\pi \leq \theta_s < (4/3)\pi \rightarrow TRI2=(12/\pi)\theta_s-15$ $(4/3)\pi \leq \theta_s < (3/2)\pi \rightarrow TRI2=(-12/\pi)\theta_s+17$ $(3/2)\pi \leq \theta_s < (5/3)\pi \rightarrow TRI2=(12/\pi)\theta_s-19$ $(5/3)\pi \leq \theta_s < (11/6)\pi \rightarrow TRI2=(-12/\pi)\theta_s+21$ $(11/6)\pi \leq \theta_s < 2\pi \rightarrow TRI2=(12/\pi)\theta_s-23$ Triangular wave frequency setting unit 21 takes power source voltage sine wave phase θs as its input. It outputs triangular wave frequency setting signal fset in response to power source voltage sine wave phase θs by the following conductional branching. That is to say, it outputs, fset=1, when $(1/6)\pi \leq \theta_s < (5/6)\pi$, $(7/6)\pi \leq \theta_s < (11/6)\pi$, and feet=2, when $0 \leq \theta_s < (1/6)\pi$, $(5/6)\pi \leq \theta_s < (7/6)\pi$, $(11/6)\pi \leq \theta_s < 2\pi$ Triangular wave switching unit 24 takes as its inputs triangular wave frequency setting signal fset which is the output of triangular wave frequency setting unit 21, high-frequency triangular wave TRI1 outputted from high-frequency triangular wave generation unit 22 and low-frequency triangular wave TRI2 outputted from low-frequency triangular wave generation unit 23. It selects and outputs, as triangular wave TRI, triangular wave TRI1 or TRI2 from the two inputted triangular waves TRI1 and TRI2 in response to triangular wave frequency setting signal fset by the following conditional branching. That is to say, when fset=1, triangular wave TRI=TRI1, and when fset=2, triangular wave TRI=TRI2.

Figure 5:
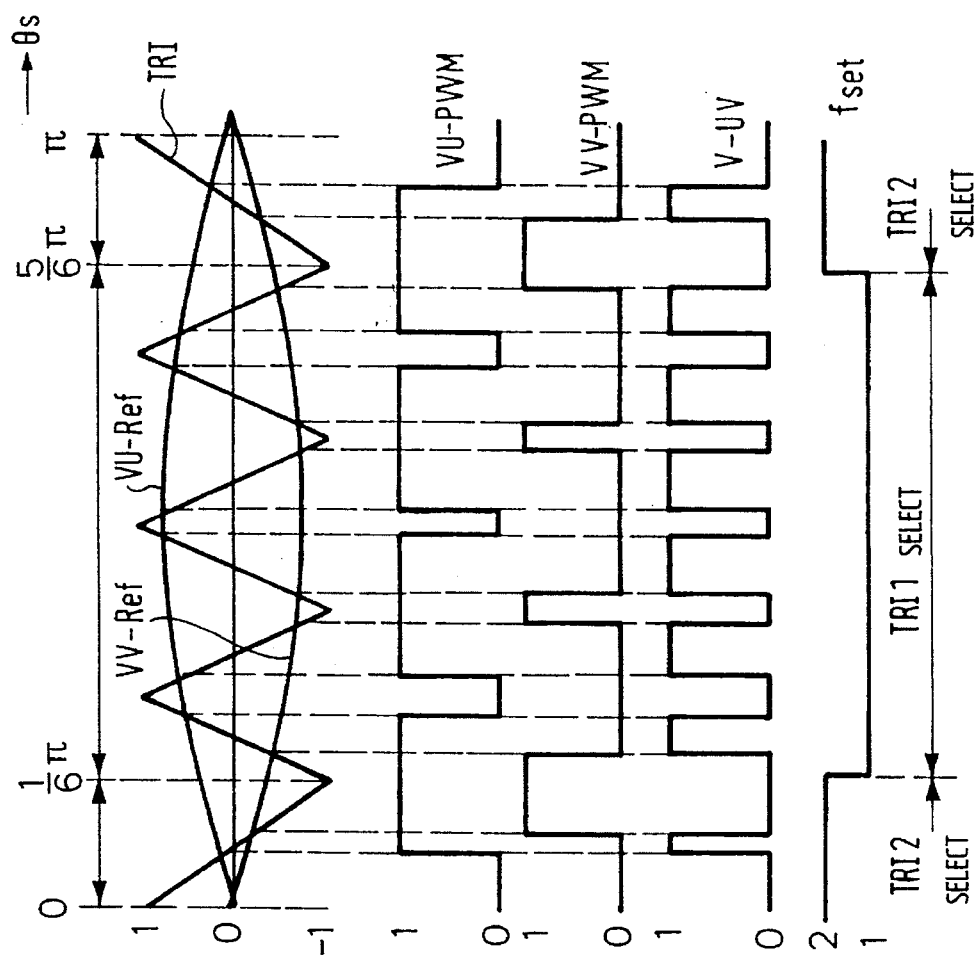
FIG. 5 is a diagram showing the triangular waveform and the PWM waveforms in the first embodiment in FIG. 1B.

Triangular waves TRI outputted from triangular wave generation unit 2 by the above operation become as shown in FIG. 5. The average frequency of triangular wave TRI is eight times that of power source voltage Vs.

FIG. 4 is a block diagram showing the composition of converter voltage reference operation unit 3. Converter voltage reference operation unit 3 is composed of a sine wave generation unit 31, a current reference amplitude operation unit 32, a current reference operation unit 33, comparators 34, 35 and 36, s divider 37 and a coefficient multiplier 38.

Sine wave generation unit 31 takes AC power source voltage sine wave phase θs as it input, and outputs a sine wave sin(θs) whose amplidtude is one, in response to power source voltage sine wave phase Current reference amplitude operation unit 32 takes a deviation ΔVdc between converter DC side voltage reference Vdc-Ref and converter DC side voltage actual value Vdc, obtained by comparator 34, as its input. It outputs the value of deviation ΔVdc multiplied by a gain G(s) as a current reference amplitude |Is|.

Current reference operation unit 33 takes output sin(θs) of sine wave generation unit 31 and output |Is| of current reference amplitude operation unit 32 as two inputs. It outputs the value of these two multiplied together as a converter AC side current reference value Is-Ref. That is to say, Is-Ref=|Is|×sin(θs).

Then, comparator 35 obtains a deviation ΔIs from output Is-Ref of current reference operation unit 33 and converter AC side current actual value Is. Comparator 36 obtains the product of the value of deviation ΔIs and a gain G2(S), subtracted from AC power source voltage Vs. Divider 37 obtains a division value which is the output of comparator 36 divided by converter DC voltage Vdc and 2. The output of divider 37 is taken as U-phase voltage reference VU-Ref. Also, the value of U-phase voltage reference VU-Ref multiplied by (−1) is outputted by coefficient multiplier 38 as V-phase voltage reference VV-Ref. That is to say, VU-Ref=1/(2·Vdc)[Vs−G2(S)·(Is-Ref−Is)]

VV-Ref=−1/(2·Vdc)[Vs−G2(S)·(Is-Ref−Is)].

Triangular wave comparison unit 4 takes output TRI of triangular wave generation unit 2 and outputs VU-Ref and VV-Ref of converter voltage reference operation unit 3 as three inputs. It outputs U-phase PWM signal VU-PWM and V-phase PWM signal VV-PWM by the following conditional branching.

When VU-Ref≧TRI, VU-PWM=1, when VU-Ref<TRI, VU-PWM=0, when VV-Ref≧TRI, VV-PWM=1, and when VV-Ref<TRI, VV-PWM=0.

Thus, by obtaining the PWM waveform using triangular wave TRI outputted from triangular wave generation unit 2, a PWM waveform in which the current amplitude does not become large can be outputted, even if the number of switchings is reduced.

As described above, the single-phase PWM converter is controlled based on AC power source voltage sine wave phase θs. That is to say, when AC power source voltage sine wave phase θs is in a phase wherein the magnitude of the PWM converter AC side current reference value is large, the current ripple is reduced by making the switching frequency higher so that the peak turn-off current of the switching devices is not exceeded. When AC power source voltage sine wave phase θs is in a phase wherein the magnitude of the PWM converter AC side current reference value is small, the switching frequency is made lower. Thus, the PWM converter switching loss can be reduced, without the addition of current smoothing reactors or the like, by reducing the mean number of switchings.

Figure 6:
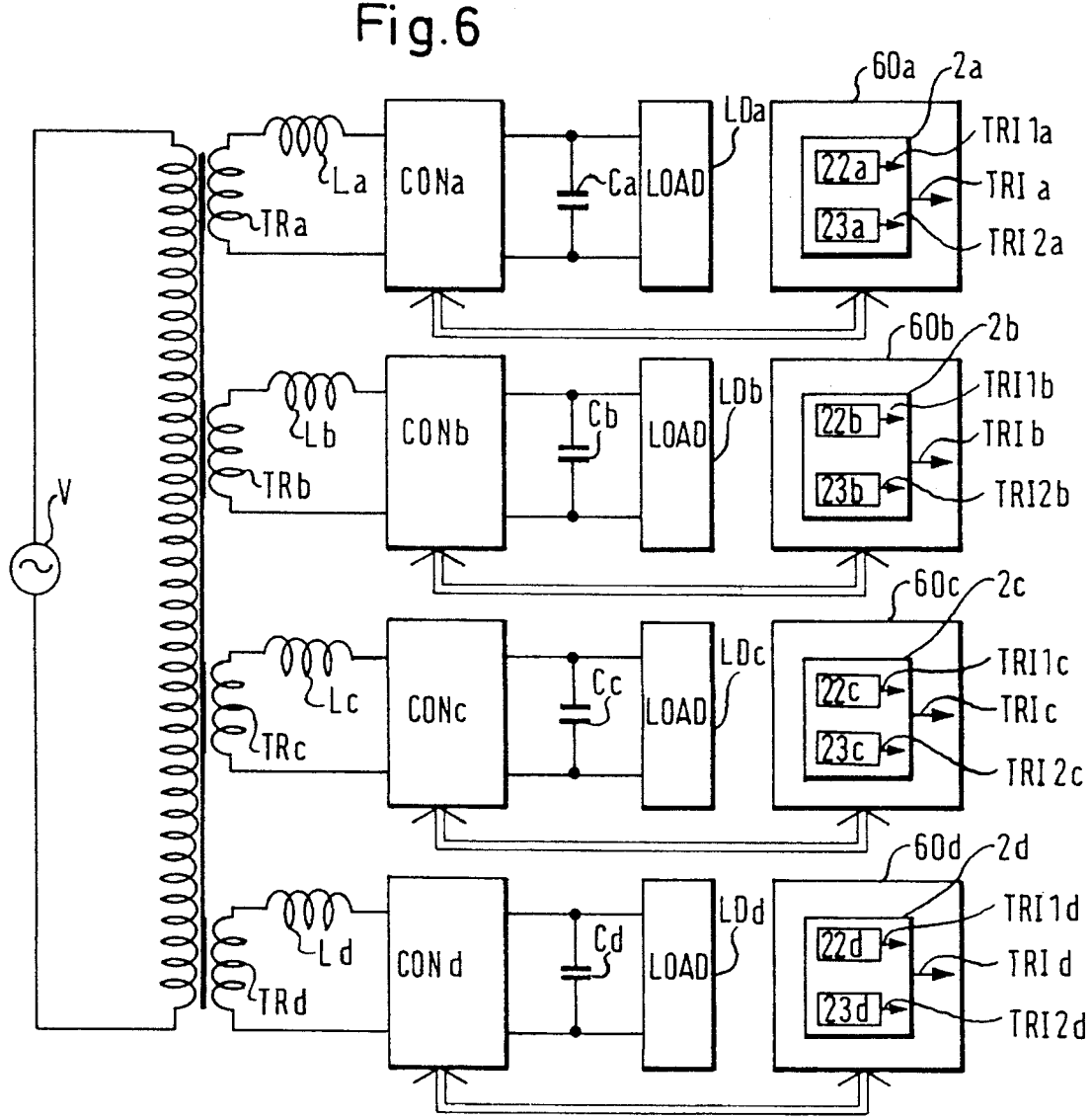
FIG. 6 is a block diagram showing a single-phase PWM converter control system according to a second embodiment of this invention.

FIG. 6 is a block diagram showing a single-phase PWM converter control system according to a second embodiment of this invention. This is an example of the application of this invention to a system in which multiple, for instance 4, single-phase PWM converters CONa, CONb, CONc and CONd are connected in parallel by transformers TRa, TRb, TRc, and TRd through reactors La, Lb, Lc and Ld, respectively.

In FIG. 6, the primary windings of transformers TRa, TRb, TRc and TRd are common. Loads LDa, LDb, LDc and LDd are connected respectively to the output sides of converters CONa, CONb, CONc and CONd via capacitors Ca, Cb, Cc and Cd.

Figure 7:
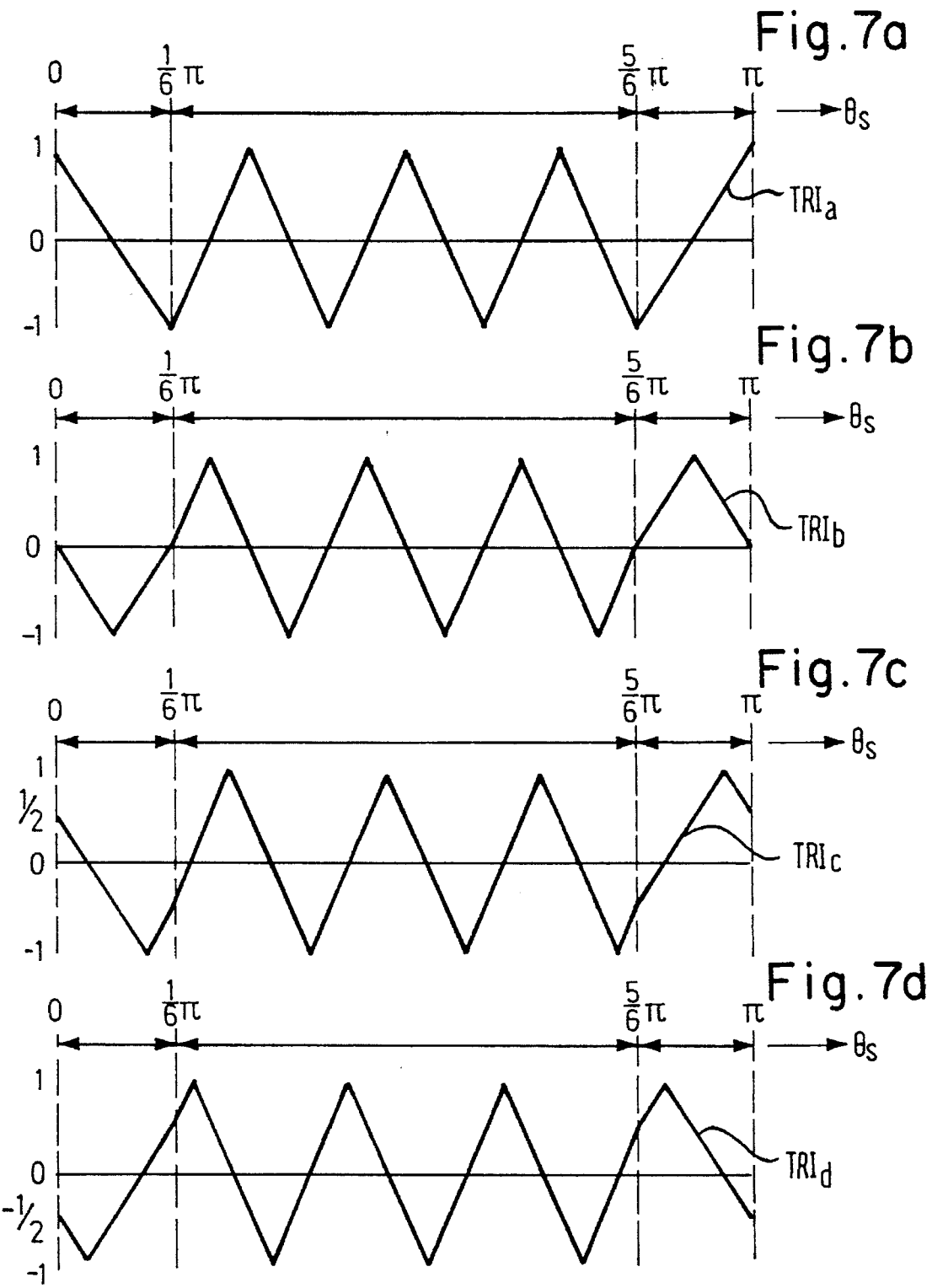
FIG. 7 is a diagram showing the triangular waveforms outputted by triangular wave generation units 2a to 2d in FIG. 6.

Four single-phase PWM converter control systems 60*a*, 60*b*, 60*c* and 60*d* are respectively constructed the same as control system 60 shown in FIG. 1B to control four single-phase converters CONa, CONb, CONc and CONd. Their respective triangular wave generation units 2*a*, 2*b*, 2*c* and 2*d* generate the following triangular waves TRIa, TRIb, TRIc and TRId so that the phases of triangular wave TRIa, TRIb, TRIc and TRId are mutually shifted from each other, as shown in FIG. 7.

In triangular wave generation unit 2*a* of single-phase PWM converter control system 60*a* which controls single-phase PWM converter CONa, high-frequency triangular wave generation unit 22*a* takes power source voltage sine wave phase θs as its input, and outputs a constant frequency triangular wave TRI1*a* in response to power source voltage sine wave phase θs as shown below.

0≦θs<(1/18)π→TRI1*a*=(18/π)θs (1/18)π≦θs<(1/6)π→TRI1*a*=(18/π)θs+2

(1/6)π≦θs<(5/18)π→TRI1*a*=(18/π)θs−4

(5/18)π≦θs<(7/18)π→TRI1*a*=(−18/π)θs+6

(7/18)π≦θs<(1/2)π→TRI1*a*=(18/π)θs−8

(1/2)π≦θs<(11/18)π→TRI1*a*=(−18/π)θs+10

(11/18)π≦θs<(13/18)π→TRI1*a*=(18/π)θs−12

(13/18)π≦θs<(5/6)π→TRI1*a*=(−18/π)θs+14

(5/6)π≦θs<(17/18)π→TRI1*a*=(18/π)θs−16

(17/18)π≦θs<π→TRI1*a*=(−18/π)θs−18

π→θs<(19/18)π→TRI1*a*=(18/π)θs−18

(19/18)π≦θs<(7/6)π→TRI1*a*=(−18/π)θs+20

(7/6)π≦θs<(23/18)π→TRI1*a*=(18/π)θs−22

(23/18)π≦θs<(25/18)π→TRI1*a*=(−18/π)θs+24

(25/18)π≦θs<(3/2)π→TRI1*a*=(18/π)θs−26

$(3/2)\pi \leq \theta s < (29/18)\pi \rightarrow TRI1a = (-18/\pi)\theta s + 28$ $(29/18)\pi \leq \theta s < (31/18)\pi \rightarrow TRI1a = (18/\pi)\theta s - 30$ $(31/18)\pi \leq \theta s < (11/6)\pi \rightarrow TRI1a = (18/\pi)\theta s + 32$ $(11/6)\pi \leq \theta s < (35/18)\pi \rightarrow TRI1a = (18/\pi)\theta s - 34$ $(35/18)\pi \leq \theta s < 2\pi \rightarrow TRI1a = (-18/\pi)\theta s + 36$ Low-frequency triangular wave generation unit 23a takes power source voltage sine wave phase θs as its input, and Outputs a constant frequency triangular wave TRI2a in response to power source voltage sine wave phase θs as shown below.

$0 \leq \theta s < (1/6)\pi \rightarrow TRI2a = (-12/\pi)\theta s + 1$ $(1/6)\pi \leq \theta s < (1/3)\pi \rightarrow TRI2a = (12/\pi)\theta s - 3$ $(1/3)\pi \leq \theta s < (1/2)\pi \rightarrow TRI2a = (-12/\pi)\theta s + 5$ $(1/2)\pi \leq \theta s < (2/3)\pi \rightarrow TRI2a = (12/\pi)\theta s - 7$ $(2/3)\pi \leq \theta s < (5/6)\pi \rightarrow TRI2a = (-12/\pi)\theta s + 9$ $(5/6)\pi \leq \theta s < \pi \rightarrow TRI2a = (12/\pi)\theta s - 11$ $\pi \leq \theta s < (7/6)\pi \rightarrow TRI2a = (-12/\pi)\theta s + 13$ $(7/6)\pi \leq \theta s < (4/3)\pi \rightarrow TRI2a = (12/\pi)\theta s - 15$ $(4/3)\pi \leq \theta s < (3/2)\pi \rightarrow TRI2a = (-12/\pi)\theta s + 17$ $(3/2)\pi \leq \theta s < (5/3)\pi \rightarrow TRI2a = (12/\pi)\theta s - 19$ $(5/3)\pi \leq \theta s < (11/6)\pi \rightarrow TRI2a = (-12/\pi)\theta s + 21$ $(11/6)\pi \leq \theta s < 2\pi \rightarrow TRI2a = (12/\pi)\theta s - 23$ The remaining composition and operations exercise control as shown in the first embodiment.

In the same way, in triangular wave generation unit 2b of single-phase PWM converter control system 60b which controls single-phase converter CONb, high-frequency triangular wave generation unit 22b takes power source voltage sine wave phase θs as its input, and outputs constant frequency triangular wave TRI1b in response to power source voltage sine wave phase θs as shown below.

$0 \leq \theta s < (1/9)\pi \rightarrow TRI1b = (-18/\pi)\theta s + 1$ $(1/9)\pi \leq \theta s < (1/3)\pi \rightarrow TRI1b = (18/\pi)\theta s - 3$ $(2/9)\pi \leq \theta s < (1/3)\pi \rightarrow TRI1b = (-18/\pi)\theta s + 5$ $(1/3)\pi \leq \theta s < (4/9)\pi \rightarrow TRI1b = (18/\pi)\theta s - 7$ $(4/9)\pi \leq \theta s < (5/9)\pi \rightarrow TRI1b = (-18/\pi)\theta s + 9$ $(5/9)\pi \leq \theta s < (2/3)\pi \rightarrow TRI1b = (18/\pi)\theta s - 11$ $(2/3)\pi \leq \theta s < (7/9)\pi \rightarrow TRI1b = (-18/\pi)\theta s + 13$ $(7/9)\pi \leq \theta s < (8/9)\pi \rightarrow TRI1b = (18/\pi)\theta s - 15$ $(8/9)\pi \leq \theta s < \pi \rightarrow TRI1b = (-18/\pi)\theta s + 17$ $\pi \leq \theta s < (10/9)\pi \rightarrow TRI1b = (18/\pi)\theta s - 19$ $(10/9)\pi \leq \theta s < (11/9)\pi \rightarrow TRI1b = (-18/\pi)\theta s + 21$ $(11/9)\pi \leq \theta s < (4/3)\pi \rightarrow TRI1b = (18/\pi)\theta s - 23$ $(4/3)\pi \leq \theta s < (13/9)\pi \rightarrow TRI1b = (-18/\pi)\theta s + 25$ $(13/9)\pi \leq \theta s < (14/9)\pi \rightarrow TRI1b = (18/\pi)\theta s - 27$ $(14/9)\pi \leq \theta s < (5/3)\pi \rightarrow TRI1b = (-18/\pi)\theta s + 29$ $(5/3)\pi \leq \theta s < (16/9)\pi \rightarrow TRI1b = (18/\pi)\theta s - 31$ $(16/9)\pi \leq \theta s < (17/9)\pi \rightarrow TRI1b = (-18/\pi)\theta s + 33$ $(17/9)\pi \leq \theta s < 2\pi \rightarrow TRI1b = (18/\pi)\theta s - 35$ Low-frequency triangular wave generation unit 23b takes power source voltage sine wave phase θs as its input, and outputs constant frequency triangular wave TRI2b in response to power source voltage sine wave phase θs as shown below.

$0 \leq \theta s < (1/12)\pi \rightarrow TRI2b = (-12/\pi)\theta s$ $(1/12)\pi \leq \theta s < (3/12)\pi \rightarrow TRI2b = (12/\pi)\theta s - 2$ $(3/12)\pi \leq \theta s < (5/12)\pi \rightarrow TRI2b = (-12/\pi)\theta s + 4$ $(5/12)\pi \leq \theta s < (7/12)\pi \rightarrow TRI2b = (12/\pi)\theta s - 6$ $(7/12)\pi \leq \theta s < (9/12)\pi \rightarrow TRI2b = (-12/\pi)\theta s + 8$ $(9/12)\pi \leq \theta s < (11/12)\pi \rightarrow TRI2b = (12/\pi)\theta s - 10$ $(11/12)\pi \leq \theta s < (13/12)\pi \rightarrow TRI2b = (-12/\pi)\theta s + 12$ $(13/12)\pi \leq \theta s < (15/12)\pi \rightarrow TRI2b = (12/\pi)\theta s - 14$ $(15/12)\pi \leq \theta s < (17/12)\pi \rightarrow TRI2b = (-12/\pi)\theta s + 16$ $(17/12)\pi \leq \theta s < (19/12)\pi \rightarrow TRI2b = (12/\pi)\theta s - 18$ $(19/12)\pi \leq \theta s < (21/12)\pi \rightarrow TRI2b = (-12/\pi)\theta s + 20$ $(21/12)\pi \leq \theta s < (23/12)\pi \rightarrow TRI2b = (12/\pi)\theta s - 22$ $(23/12)\pi \leq \theta s < 2\pi \rightarrow TRI2b = (-12/\pi)\theta s + 24$ The remaining composition and operations exercise control as shown in the first embodiment.

In the same way, in triangular wave generation unit 2c of single-phase PWM converter control system 60c which controls single-phase converter CONc, high-frequency triangular wave generation unit 22c takes power source voltage sine wave phase θs as its input, and outputs constant frequency triangular wave TRI1c in response to power source voltage sine wave phase θs as shown below.

$0 \leq \theta s < (1/36)\pi \rightarrow TRI1c = (18\pi)\theta s + 1/2$ $(1/36)\pi \leq \theta s < (5/36)\pi \rightarrow TRI1c = (-18/\pi)\theta s + 3/2$ $(5/36)\pi \leq \theta s < (9/36)\pi \rightarrow TRI1c = (18/\pi)\theta s - 7/2$ $(9/36)\pi \leq \theta s < (13/36)\pi \rightarrow TRI1c = (-18/\pi)\theta s + 11/2$ $(13/36)\pi \leq \theta s < (17/36)\pi \rightarrow TRI1c = (18/\pi)\theta s - 15/2$ $(17/36)\pi \leq \theta s < (21/36)\pi \rightarrow TRI1c = (-18/\pi)\theta s + 19/2$ $(21/36)\pi \leq \theta s < (25/36)\pi \rightarrow TRI1c = (18/\pi)\theta s - 23/2$ $(25/36)\pi \leq \theta s < (29/36)\pi \rightarrow TRI1c = (-18/\pi)\theta s + 27/2$ $(29/36)\pi \leq \theta s < (33/36)\pi \rightarrow TRI1c = (18/\pi)\theta s - 31/2$ $(33/36)\pi \leq \theta s < (37/36)\pi \rightarrow TRI1c = (-18/\pi)\theta s + 35/2$ $(37/36)\pi \leq \theta s < (41/36)\pi \rightarrow TRI1c = (18/\pi)\theta s - 39/2$ $(41/36)\pi \leq \theta s < (45/36)\pi \rightarrow TRI1c = (-18/\pi)\theta s + 43/2$ $(45/36)\pi \leq \theta s < (49/36)\pi \rightarrow TRI1c = (18/\pi)\theta s - 47/2$ $(49/36)\pi \leq \theta s < (53/36)\pi \rightarrow TRI1c = (-18/\pi)\theta s + 51/2$ $(^{53}/_{36})\pi \leq \theta s < (^{57}/_{36})\pi \rightarrow TRI1c = (18/\pi)\theta s - ^{55}/_2$ $(^{57}/_{36})\pi \leq \theta s < (^{61}/_{36})\pi \rightarrow TRI1c = (-18/\pi)\theta s + ^{59}/_2$ $(^{61}/_{36})\pi \leq \theta s < (^{65}/_{36})\pi \rightarrow TRI1c = (18/\pi)\theta s - ^{63}/_2$ $(^{65}/_{36})\pi \leq \theta s < (^{69}/_{36})\pi \rightarrow TRI1c = (-18/\pi)\theta s + ^{67}/_2$ $(^{69}/_{36})\pi \leq \theta s < 2\pi \rightarrow TRI1c = (18/\pi)\theta s - ^{71}/_2$ Low-frequency triangular wave generation unit 23c takes power source voltage sine wave phase θs as its input, and outputs constant frequency triangular wave TRI2c in response to power source voltage sine wave phase θs as shown below.

$0 \leq \theta s < (^3/_{24})\pi \rightarrow TRI2c = (-12/\pi)\theta s + ^1/_2$ $(^3/_{24})\pi \leq \theta s < (^7/_{24})\pi \rightarrow TRI2c = (12/\pi)\theta s - ^5/_2$ $(^7/_{24})\pi \leq \theta s < (^{11}/_{24})\pi \rightarrow TRI2c = (-12/\pi)\theta s + ^9/_2$ $(^{11}/_{24})\pi \leq \theta s < (^{15}/_{24})\pi \rightarrow TRI2c = (12/\pi)\theta s - ^{13}/_2$ $(^{15}/_{24})\pi \leq \theta s < (^{19}/_{24})\pi \rightarrow TRI2c = (-12/\pi)\theta s + ^{17}/_2$ $(^{19}/_{24})\pi \leq \theta s < (^{23}/_{24})\pi \rightarrow TRI2c = (12/\pi)\theta s - ^{21}/_2$ $(^{23}/_{24})\pi \leq \theta s < (^{27}/_{24})\pi \rightarrow TRI2c = (-12/\pi)\theta s + ^{25}/_2$ $(^{27}/_{24})\pi \leq \theta s < (^{31}/_{24})\pi \rightarrow TRI2c = (12/\pi)\theta s - ^{29}/_2$ $(^{31}/_{24})\pi \leq \theta s < (^{35}/_{24})\pi \rightarrow TRI2c = (-12/\pi)\theta s + ^{33}/_2$ $(^{35}/_{24})\pi \leq \theta s < (^{39}/_{24})\pi \rightarrow TRI2c = (12/\pi)\theta s - ^{37}/_2$ $(^{39}/_{24})\pi \leq \theta s < (^{43}/_{24})\pi \rightarrow TRI2c = (-12/\pi)\theta s + ^{41}/_2$ $(^{43}/_{24})\pi \leq \theta s < (^{47}/_{24})\pi \rightarrow TRI2c = (12/\pi)\theta s - ^{45}/_2$ $(^{47}/_{24})\pi \leq \theta s < 2\pi \rightarrow TRI2c = (-12/\pi)\theta s + ^{49}/_2$ The remaining composition and operations exercise control as shown in the first embodiment.

In the same way, in triangular wave generation unit 2d of single-phase PWM converter control system 60d which controls single-phase converter CONd, high-frequency triangular wave generation unit 22d takes power source voltage sine wave phase θs as its input, and outputs constant frequency triangular wave TRI1d in response to power source voltage sine wave phase θs as shown below.

$0 \leq \theta s < (^3/_{36})\pi \rightarrow TRI1d = (-18/\pi)\theta s + ^1/_2$ $(^3/_{36})\pi \leq \theta s < (^7/_{36})\pi \rightarrow TRI1d = (18/\pi)\theta s - ^5/_2$ $(^7/_{36})\pi \leq \theta s < (^{11}/_{36})\pi \rightarrow TRI1d = (-18/\pi)\theta s + ^9/_2$ $(^{11}/_{36})\pi \leq \theta s < (^{15}/_{36})\pi \rightarrow TRI1d = (18/\pi)\theta s - ^{13}/_2$ $(^{15}/_{36})\pi \leq \theta s < (^{19}/_{36})\pi \rightarrow TRI1d = (-18/\pi)\theta s + ^{17}/_2$ $(^{19}/_{36})\pi \leq \theta s < (^{23}/_{36})\pi \rightarrow TRI1d = (18/\pi)\theta s - ^{21}/_2$ $(^{23}/_{36})\pi \leq \theta s < (^{27}/_{36})\pi \rightarrow TRI1d = (-18/\pi)\theta s + ^{25}/_2$ $(^{27}/_{36})\pi \leq \theta s < (^{31}/_{36})\pi \rightarrow TRI1d = (18/\pi)\theta s - ^{29}/_2$ $(^{31}/_{36})\pi \leq \theta s < (^{35}/_{36})\pi \rightarrow TRI1d = (-18/\pi)\theta s + ^{33}/_2$ $(^{35}/_{36})\pi \leq \theta s < (^{39}/_{36})\pi \rightarrow TRI1d = (18/\pi)\theta s - ^{37}/_2$ $(^{39}/_{36})\pi \leq \theta s < (^{43}/_{36})\pi \rightarrow TRI1d = (-18/\pi)\theta s + ^{41}/_2$ $(^{43}/_{36})\pi \leq \theta s < (^{47}/_{36})\pi \rightarrow TRI1d = (18/\pi)\theta s - ^{45}/_2$ $(^{47}/_{36})\pi \leq \theta s < (^{51}/_{36})\pi \rightarrow TRI1d = (-18/\pi)\theta s + ^{49}/_2$ $(^{51}/_{36})\pi \leq \theta s < (^{55}/_{36})\pi \rightarrow TRI1d = (18/\pi)\theta s - ^{53}/_2$ $(^{55}/_{36})\pi \leq \theta s < (^{59}/_{36})\pi \rightarrow TRI1d = (-18/\pi)\theta s + ^{57}/_2$ $(^{59}/_{36})\pi \leq \theta s < (^{63}/_{36})\pi \rightarrow TRI1d = (18/\pi)\theta s - ^{61}/_2$ $(^{63}/_{36})\pi \leq \theta s < (^{67}/_{36})\pi \rightarrow TRI1d = (-18/\pi)\theta s + ^{65}/_2$ $(^{67}/_{36})\pi \leq \theta s < (^{71}/_{36})\pi \rightarrow TRI1d = (18/\pi)\theta s - ^{69}/_2$ $(^{71}/_{36})\pi \leq \theta s < 2\pi \rightarrow TRI1d = (-18/\pi)\theta s + ^{73}/_2$ Low-frequency triangular wave generation unit 23d takes power source voltage sine wave phase θs as its input, and outputs constant frequency triangular wave TRI2d in response to power source voltage sine wave phase θs as shown below.

$0 \leq \theta s < (^1/_{24})\pi \rightarrow TRI2d = (-12/\pi)\theta s - ^1/_2$ $(^1/_{24})\pi \leq \theta s < (^5/_{24})\pi \rightarrow TRI2d = (12/\pi)\theta s - ^3/_2$ $(^5/_{24})\pi \leq \theta s < (^9/_{24})\pi \rightarrow TRI2d = (-12/\pi)\theta s + ^7/_2$ $(^9/_{24})\pi \leq \theta s < (^{13}/_{24})\pi \rightarrow TRI2d = (12/\pi)\theta s - ^{11}/_2$ $(^{13}/_{24})\pi \leq \theta s < (^{17}/_{24})\pi \rightarrow TRI2d = (-12/\pi)\theta s + ^{15}/_2$ $(^{17}/_{24})\pi \leq \theta s < (^{21}/_{24})\pi \rightarrow TRI2d = (12/\pi)\theta s - ^{19}/_2$ $(^{21}/_{24})\pi \leq \theta s < (^{25}/_{24})\pi \rightarrow TRI2d = (-12/\pi)\theta s + ^{23}/_2$ $(^{25}/_{24})\pi \leq \theta s < (^{29}/_{24})\pi \rightarrow TRI2d = (12/\pi)\theta s - ^{27}/_2$ $(^{29}/_{24})\pi \leq \theta s < (^{33}/_{24})\pi \rightarrow TRI2d = (-12/\pi)\theta s + ^{31}/_2$ $(^{33}/_{24})\pi \leq \theta s < (^{37}/_{24})\pi \rightarrow TRI2d = (12/\pi)\theta s - ^{35}/_2$ $(^{37}/_{24})\pi \leq \theta s < (^{41}/_{24})\pi \rightarrow TRI2d = (-12/\pi)\theta s + ^{39}/_2$ $(^{41}/_{24})\pi \leq \theta s < (^{45}/_{24})\pi \rightarrow TRI2d = (12/\pi)\theta s - ^{43}/_2$ $(^{45}/_{24})\pi \leq \theta s < 2\pi \rightarrow TRI2d = (-12/\pi)\theta s + ^{47}/_2$ The remaining composition and operations exercise control as shown in the first embodiment.

In the same way as the first embodiment, PWM waveforms are obtained using triangular waves TRIa, TRIb, TRIc and TRId, shown in FIG. 7, which are outputted by triangular wave generation units 2a, 2b, 2c and 2d. By this means, PWM waveforms in which the current amplitude does not become large can be outputted, even if the number of switching is reduced. Moreover, according to this embodiment the current ripple in the common primary winding of transformers TRa, TRb, TRc and TRd can be reduced, because the phases of triangular waves TRIa, TRIb, TRIc and TRId are mutually shifted from each other as shown in FIG. 7.

Figure 8:
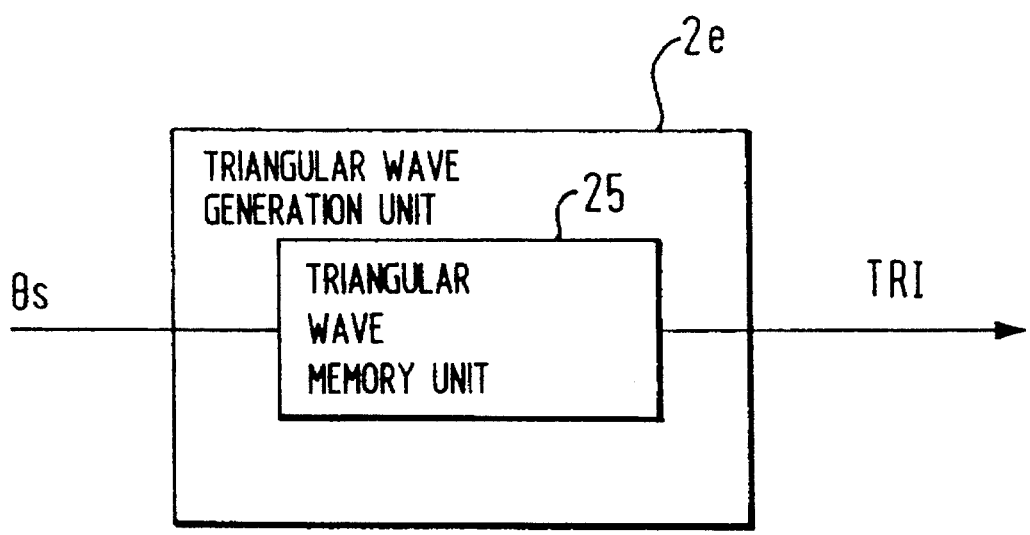
FIG. 8 is a block diagram showing a triangular wave generation unit 2e in a single-phase PWM converter control system according to a third embodiment of this invention.

FIG. 8 is a block diagram showing the essential part, that is to say a triangular wave generation unit 2e of a single-phase PWM converter control system according to a third embodiment of this invention. It is an example of triangular wave generation unit 2 in the first embodiment being displaced by triangular wave generation unit 2e composed only of a triangular wave memory unit 25.

Triangular wave memory unit 25 takes power source voltage sine wave phase θs as its input, and outputs the following triangular wave TRI in response to power source voltage sine wave phase θs.

$0 \leq \theta s < (^1/_6)\pi \rightarrow TRI = (-12/\pi)\theta s + 1$ $(^1/_6)\pi \leq \theta s < (^5/_{18})\pi \rightarrow TRI = (18/\pi)\theta s - 4$ $(5/18)\pi \leq \theta s < (7/18)\pi \rightarrow TRI=(-18/\pi)\theta s+6$ $(7/18)\pi \leq \theta s < (1/2)\pi \rightarrow TRI=(18/\pi)\theta s-8$ $(1/2)\pi \leq \theta s < (11/18)\pi \rightarrow TRI=(-18/\pi)\theta s+10$ $(11/18)\pi \leq \theta s < (13/18)\pi \rightarrow TRI=(18/\pi)\theta s-12$ $(13/18)\pi \leq \theta s < (5/6)\pi \rightarrow TRI=(-18/\pi)\theta s+14$ $(5/6)\pi \leq \theta s < \pi \rightarrow TRI=(12/\pi)\theta s-11$ $\pi \leq \theta s < (7/6)\pi \rightarrow TRI=(-12/\pi)\theta s+13$ $(7/6)\pi \leq \theta s < (23/18)\pi \rightarrow TRI=(18/\pi)\theta s-22$ $(23/18)\pi \leq \theta s < (25/18)\pi \rightarrow TRI=(-18/\pi)\theta s+24$ $(25/18)\pi \leq \theta s < (3/2)\pi \rightarrow TRI=(18/\pi)\theta s-26$ $(3/2)\pi \leq \theta s < (29/18)\pi \rightarrow TRI=(-18/\pi)\theta s+28$ $(29/18)\pi \leq \theta s < (31/18)\pi \rightarrow TRI=(18/\pi)\theta s-30$ $(31/18)\pi \leq \theta s < (11/6)\pi \rightarrow TRI=(-18/\pi)\theta s+32$ $(11/6)\pi \leq \theta s < 2\pi \rightarrow TRI=(12/\pi)\theta s-23$ Namely, triangular wave TRI generated from triangular wave memory unit 25 has the same waveform as that of triangular wave TRI generated from triangular wave generation unit 2 of FIG. 3 as shown in FIG. 5.

The remaining composition and operations exercise control as shown in the first embodiment.

In the same way as in the first embodiment, a PWM waveform is obtained using triangular wave TRI outputted from triangular wave generation unit 2e. By this means, a PWM waveform in which the current amplitude does not become large can be outputted, even if the number of switching is reduced.

Figure 9:
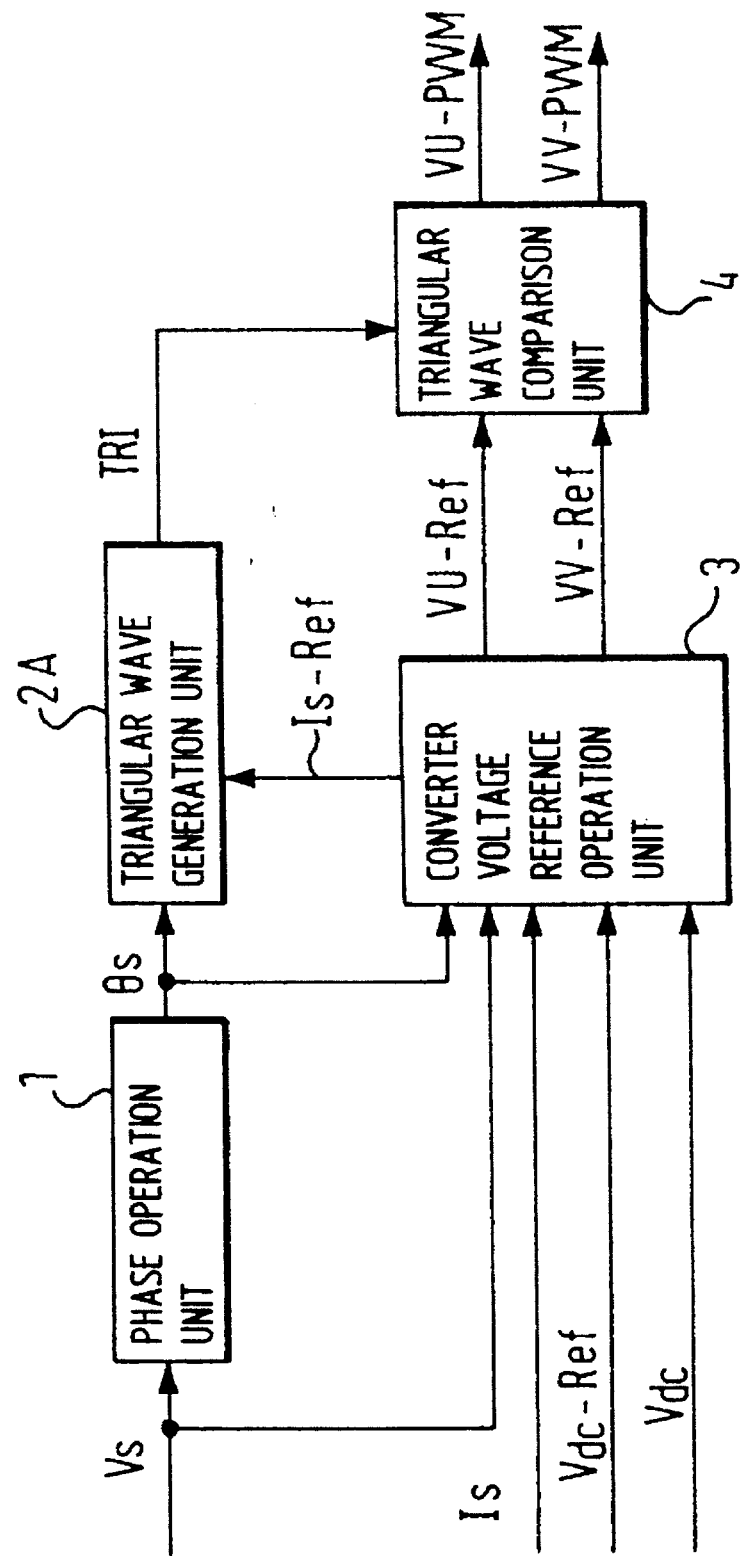
FIG. 9 is a block diagram showing a single-phase PWM converter control system according to a fourth embodiment of this invention.
Figure 10:
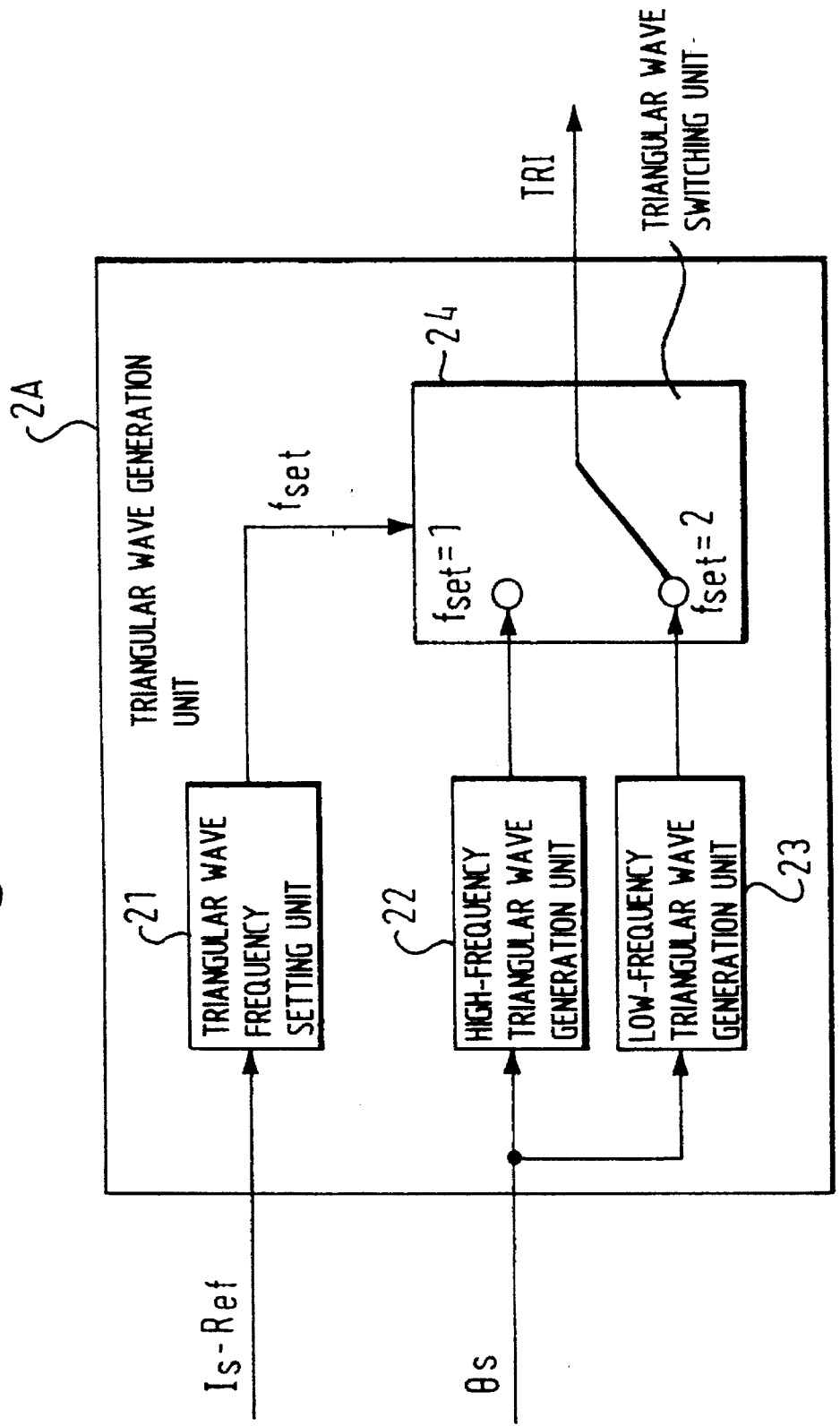
FIG. 10 is a block diagram showing the composition of a triangular wave generation unit 2A.

A single-phase PWM converter control system according to a fourth embodiment of this invention is described with reference to FIGS. 9 and 10. FIGS. 9 and 10 are block diagrams showing respectively the overall composition of a control system 60A and the composition of a triangular wave generation unit 2A in the fourth embodiment of this invention.

In FIG. 9, the point which differs from the embodiment in FIG. 1B is the point that converter AC side current reference value Is-Ref is outputted from converter voltage reference operation unit 3 to triangular wave generation unit 2A. Since points other than this are the same as in FIG. 1B, their descriptions have been omitted.

Also, triangular wave generation unit 2A of this embodiment is composed as shown in FIG. 10. The point which differs from FIG. 3 is the point that a triangular wave frequency setting unit 21A in triangular wave generation unit 2A determines triangular wave frequency setting signal fset based on the magnitude of converter AC current side reference value Is-Ref.

The operation of triangular wave frequency setting unit 21A is described using FIG. 10. Triangular wave frequency setting unit 21A takes converter AC side current reference value Is-Ref as its input. It outputs triangular wave frequency setting signal fset using the magnitude of the converter AC side current reference value Is-Ref in the following way.

A predetermined triangular wave frequency setting switching value is taken as Is-set. At this time, when $|Is|<Is\text{-set}$, fset=2, and when $|Is|\geq Is\text{-set}$, fset=1 are outputted from triangular wave frequency setting unit 21A.

The remaining composition and operations exercise control as shown in the first embodiment.

In the same way as in the first embodiment, a PWM waveform is obtained using the triangular wave TRI outputted from triangular wave generation unit 2A. By this means, a PWM waveform in which the current amplitude does not become large can be outputted, even if the number of switching is reduced.

As described above, the single-phase PWM converter is controlled based on the magnitude of converter AC side current reference value Is-Ref. That is to say when the magnitude of converter AC side current reference value Is-Ref is large, the current ripple is reduced by making the switching frequency higher so that the peak turn-off current of the switching devices is not exceeded. When the magnitude of converter AC side current reference value Is-Ref is small, the switching frequency is made lower. Thus, the PWM converter switching loss can be reduced, without the addition of current smoothing reactors or the like, by reducing the mean number of switchings.

Figure 11:
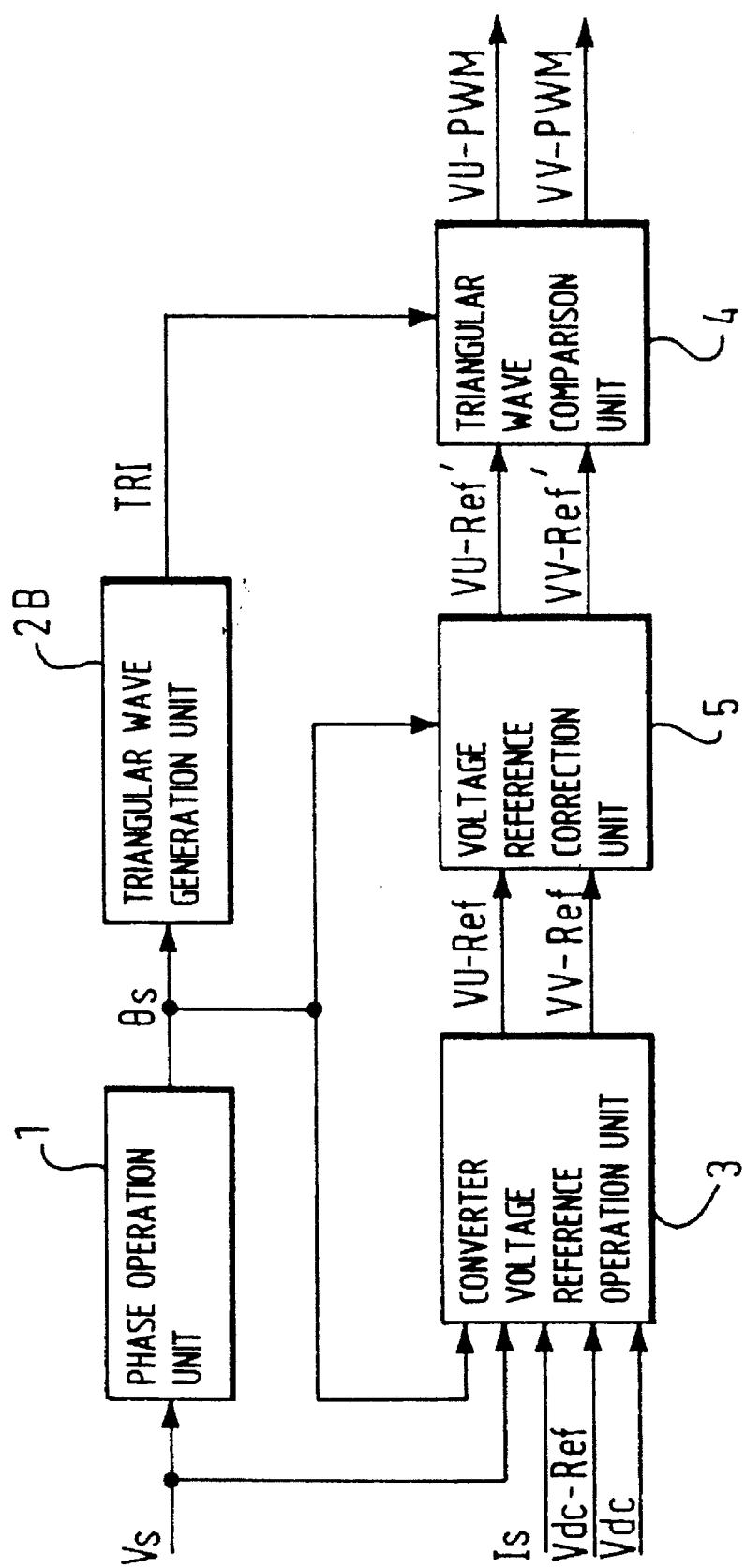
FIG. 11 is a block diagram showing a single-phase PWM converter control system according to a fifth embodiment of this invention.

FIG. 11 is a block diagram showing the overall composition of a single-phase PWM converter control system 60B according to a fifth embodiment of this invention. This is an embodiment for the case when the system operates in the 7-pulse PWM mode with seven pulses in a half-cycle of AC power source V.

This control system 60B is composed of phase operation unit 1, converter voltage reference operation unit 3 and triangular wave comparison unit 4 in the same way as in the first embodiment.

Apart from this, a voltage reference correction operation unit 5 is added, and a triangular wave generation unit 2B is displaced for triangular wave generation unit 2 shown in FIG. 3.

Phase operation unit I is composed, for example, as shown in FIG. 2. It inputs power source voltage Vs of single-phase AC power source V and operates and outputs power source voltage sine wave phase θs.

Triangular wave generation unit 2B takes AC power source voltage sine wave phase θs as its input. It outputs a constant frequency triangular wave TRI in synchronization with this AC power source voltage sine wave phase θs as described later in detail.

Converter voltage reference operation unit 3 is composed, for example, as shown in FIG. 4. It takes as its inputs AC power source voltage sine wave phase θs, power source voltage Vs, converter AC side current actual value Is, converter DC side voltage reference Vdc-Ref and converter DC side current actual value Vdc. It executes a specified operation process and outputs U-phase voltage reference VU-Ref and V-phase voltage reference VV-Ref.

Voltage reference correction operation unit 5 takes the converter voltage reference values (U-phase voltage reference VU-Ref and V-phase voltage reference VV-Ref), which have been computed by converter voltage reference operation unit 3, and AC power source voltage sine wave phase θs as inputs. It outputs a U-phase voltage reference corrected value VU-Ref' and a V-phase voltage reference corrected value VV-Ref', which are corrected converter voltage reference values, in response to AC power source voltage sine wave phase θs. The detail will be described later.

Triangular wave comparison unit 4 takes triangular wave TRI outputted from triangular wave generation unit 2B and voltage reference corrected values VU-Ref' and VV-Ref' outputted from voltage reference correction unit 5 as its outputs. It outputs PWM signals VU-PWM and VV-PWM from the comparison result of these two values VU-Ref' and VV-Ref' and the value of triangular wave TRI, respectively.

Figure 12:
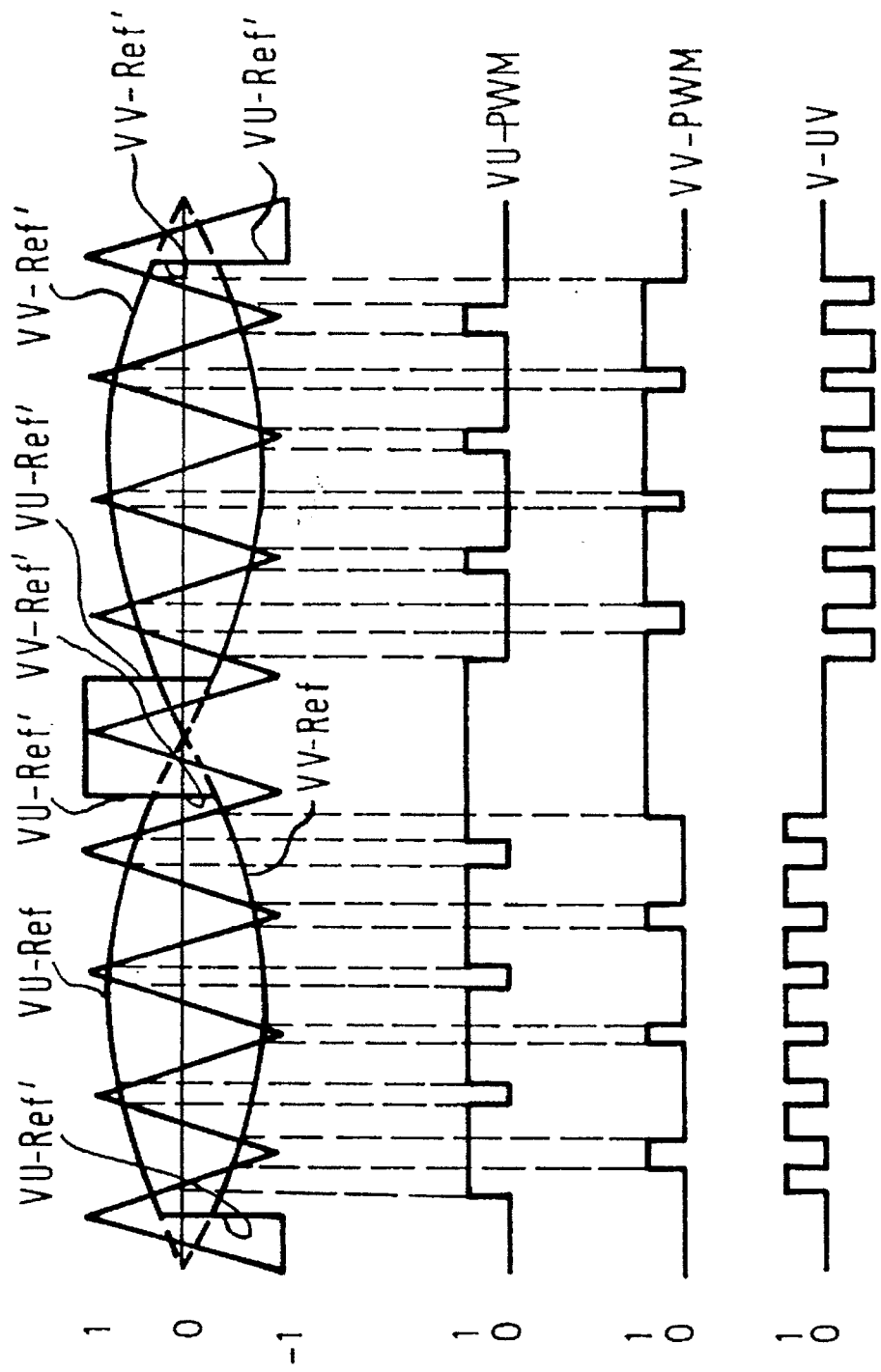
FIG. 12 is a diagram showing the triangular waveform and the PWM waveforms in the fifth embodiment in FIG. 11.

The following is a description of the operation of the fifth embodiment, composed in this way, with reference to FIG. 12. Here, when triangular wave generation unit 2B inputs AC power source voltage sine wave phase θs, it outputs constant frequency triangular wave TRI, as shown below, in response to AC power source voltage sine wave phase θs.

$0 \leq \theta s < (1/9)\pi \rightarrow TRI = (18/\pi)\theta s - 1$ $(1/9)\pi \leq \theta s < (2/9)\pi \rightarrow TRI = (-18/\pi)\theta s + 3$ $(2/9)\pi \leq \theta s < (3/9)\pi \rightarrow TRI = (18/\pi)\theta s - 5$ $(3/9)\pi \leq \theta s < (4/9)\pi \rightarrow TRI = (-18/\pi)\theta s + 7$ $(4/9)\pi \leq \theta s < (5/9)\pi \rightarrow TRI = (18/\pi)\theta s - 9$ $(5/9)\pi \leq \theta s < (6/9)\pi \rightarrow TRI = (-18/\pi)\theta s + 11$ $(6/9)\pi \leq \theta s < (7/9)\pi \rightarrow TRI = (18/\pi)\theta s - 13$ $(7/9)\pi \leq \theta s < (8/9)\pi \rightarrow TRI = (-18/\pi)\theta s + 15$ $(8/9)\pi \leq \theta s < (9/9)\pi \rightarrow TRI = (18/\pi)\theta s - 17$ $(9/9)\pi \leq \theta s < (10/9)\pi \rightarrow TRI = (-18/\pi)\theta s + 19$ $(10/9)\pi \leq \theta s < (11/9)\pi \rightarrow TRI = (18/\pi)\theta s - 21$ $(11/9)\pi \leq \theta s < (12/9)\pi \rightarrow TRI = (-18/\pi)\theta s + 23$ $(12/9)\pi \leq \theta s < (13/9)\pi \rightarrow TRI = (18/\pi)\theta s - 25$ $(13/9)\pi \leq \theta s < (14/9)\pi \rightarrow TRI = (-18/\pi)\theta s + 27$ $(14/9)\pi \leq \theta s < (15/9)\pi \rightarrow TRI = (18/\pi)\theta s - 29$ $(15/9)\pi \leq \theta s < (16/9)\pi \rightarrow TRI = (-18/\pi)\theta s + 31$ $(16/9)\pi \leq \theta s < (17/9)\pi \rightarrow TRI = (18/\pi)\theta s - 33$ $(17/9)\pi \leq \theta s < (18/9)\pi \rightarrow TRI = (-18/\pi)\theta s + 35$ Voltage reference correction unit 5 takes U-phase voltage reference VU-Ref and V-phase voltage reference VV-Ref, which are outputted from converter voltage reference operation unit 3, and AC power source voltage sine wave phase θs as its inputs. It corrects converter voltage reference values VU-Ref and VV-Ref and outputs U-phase voltage reference corrected value VU-ref' and V-phase voltage reference corrected value VV-Ref' in the following way in response to AC power source voltage sine wave phase θs.

$0 \leq \theta s < (1/9)\pi \rightarrow VU\text{-Ref'} = -1$ $0 \leq \theta s < (1/9)\pi \rightarrow VV\text{-Ref'} = -1$ $(1/9)\pi \leq \theta s < (8/9)\pi \rightarrow VU\text{-Ref'} = VU\text{-Ref}$ $(1/9)\pi \leq \theta s < (8/9)\pi \rightarrow VV\text{-Ref'} = VV\text{-Ref}$ $(8/9)\pi \leq \theta s < (10/9)\pi \rightarrow VU\text{-Ref'} = 1$ $(8/9)\pi \leq \theta s < (10/9)\pi \rightarrow VV\text{-Ref'} = 1$ $(10/9)\pi \leq \theta s < (17/9)\pi \rightarrow VU\text{-Ref'} = VU\text{-Ref}$ $(10/9)\pi \leq \theta s < (17/9)\pi \rightarrow VV\text{-Ref'} = VV\text{-Ref}$ $(17/9)\pi \leq \theta s < (18/9)\pi \rightarrow VU\text{-Ref'} = -1$ $(17/9)\pi \leq \theta s < (18/9)\pi \rightarrow VV\text{-Ref'} = -1$ Needless to say, phase operation unit 1, converter voltage reference operation unit 3 and triangular wave comparison unit 4 operate in the same way as in the first embodiment.

As described above, a PWM waveform is obtained using triangular wave TRI from triangular wave generation unit 2B and voltage reference corrected values VU-Ref' and VV-Ref' from voltage reference correction unit 5. By this means, a PWM waveform can be obtained in which the current amplitude does not becomes large, even if the number of switchings is reduced.

The followings are descriptions of further embodiments of this invention with reference to the drawings.

Figure 13:
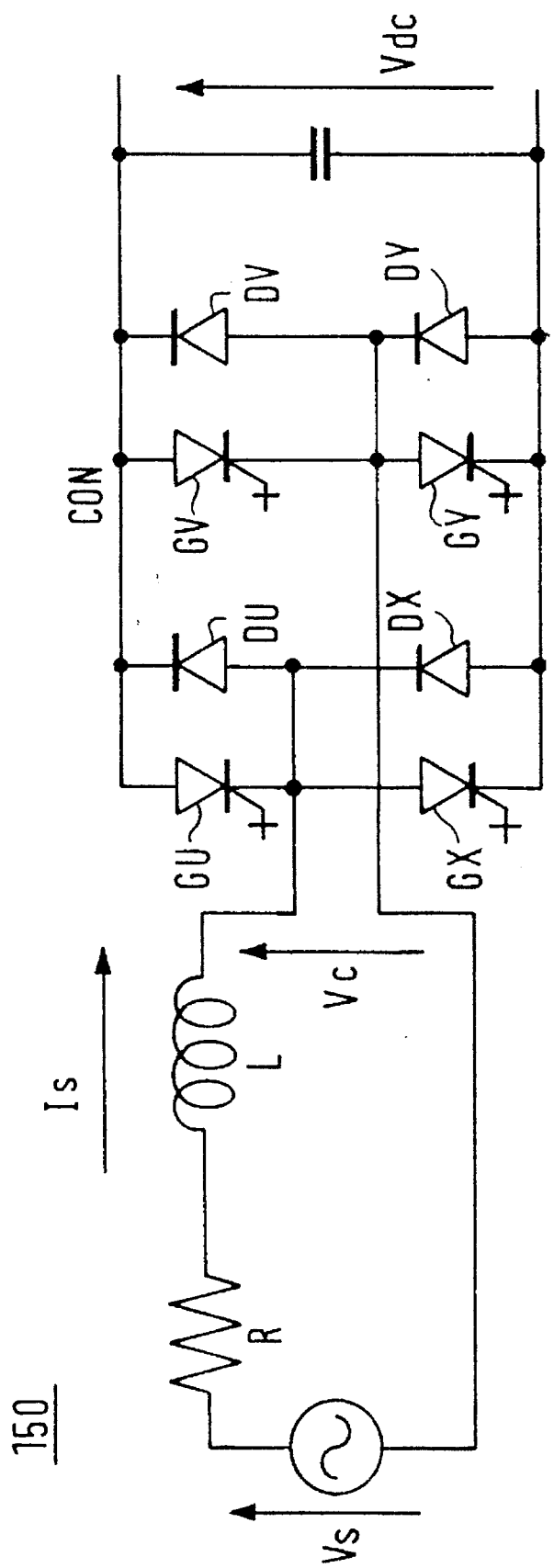
FIG. 13 is a circuit diagram showing a main circuit of a single-phase PWM converter to which this invention is applied.

FIG. 13 shows a main circuit 150 of the single-phase PWM converter to which this invention is applied. In FIG. 13, main circuit 150 is composed of a single-phase AC power source V, a resistor R, a reactor L, a capacitor C, and a converter CON composed of semiconductor devices having ON/OFF control terminals, such as GTOs (gate turn-off thyristors) GU, GV, GX and GY and diodes DU, DV, DX and DY each connected in parallel to one of semiconductor devices GU, GV, GX and GY, respectively.

Figure 14:
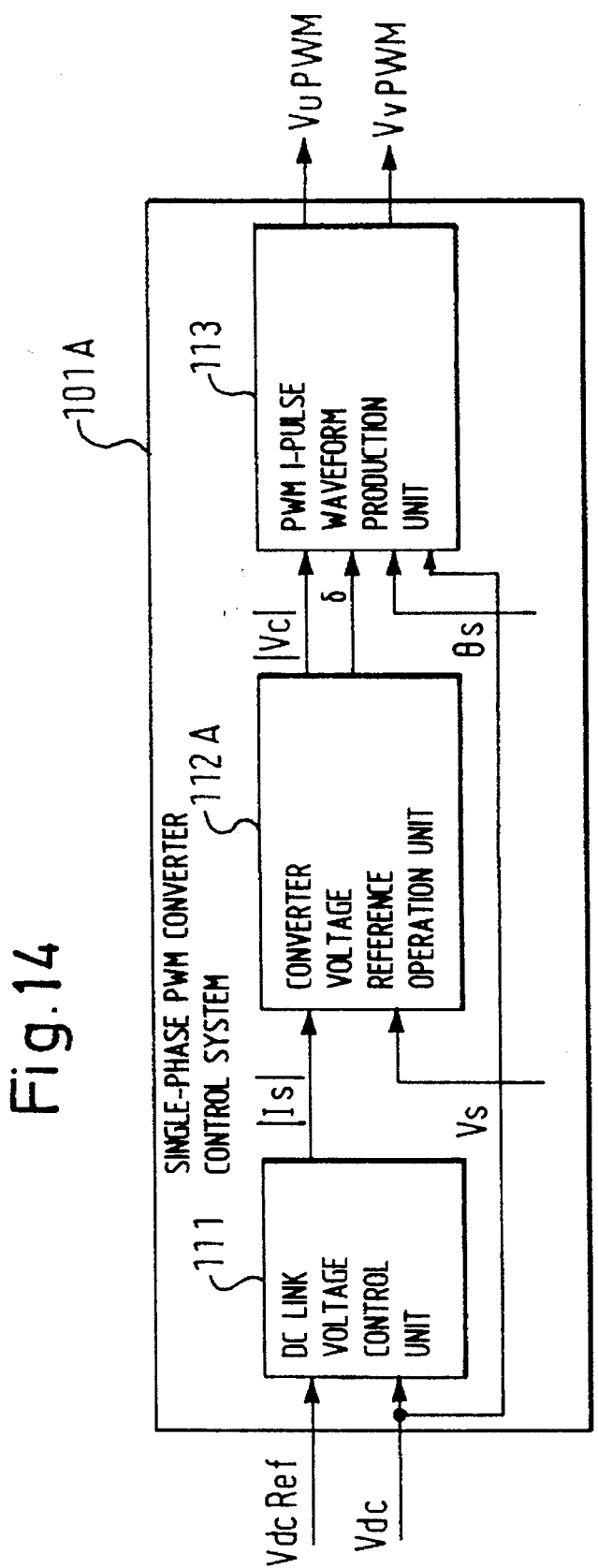
FIG. 14 is a block diagram showing a single-phase PWM converter control system according to a sixth embodiment of this invention.

FIG. 14 is a block diagram showing a single-phase PWM converter control system 101A according to a sixth embodiment of this invention. As shown in FIG. 14, single-phase PWM converter control system 101A is composed of DC link voltage control unit 111, converter voltage reference operation unit 112A and a PWM 1-pulse waveform production unit 113.

Figure 15:
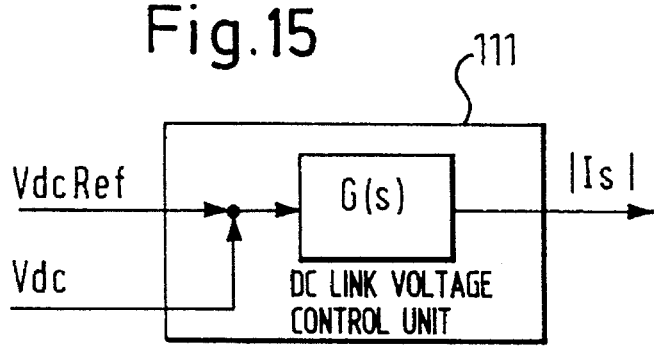
FIG. 15 is a block diagram showing the composition of a DC link voltage control unit 111.
Figure 16:
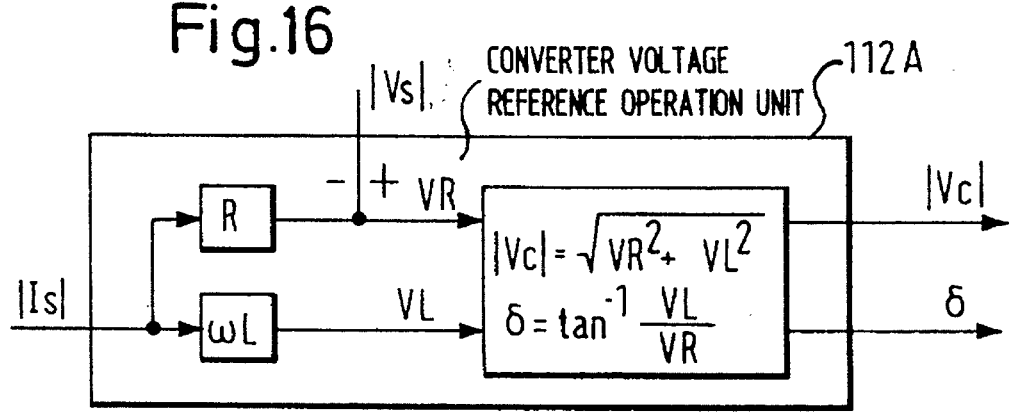
FIG. 16 is a block diagram showing the composition of a converter voltage reference operation unit 112A.
Figure 17:
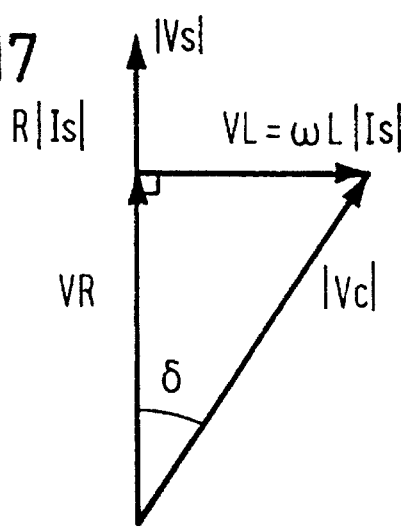
FIG. 17 is a diagram showing the converter AC side voltage/current vector.

As shown in FIG. 15, DC link voltage control unit 111 inputs DC link voltage reference value VdcRef and DC link voltage actual value Vdc. It outputs the value of the deviation between DC link voltage reference value VdcRef and DC link voltage actual value Vdc multiplied by a gain G(s) as converter AC side current amplitude |Is|. That is to say, $|Is| = G(s) \times (VdcRef - Vdc)$ As shown in FIG. 16, converter voltage reference operation unit 112A obtains an orthogonal component voltage VL for power source voltage Vs by multiplying converter AC side current amplitude |Is| outputted from DC link voltage control unit 111, an AC power source angular frequency ω (when the power source frequency is 50 Hz, ω=2×π×50 (rad/sec)) and converter AC side inductance L. That is to say, $VL = \omega \cdot L \cdot |Is|$ Also, it obtains a parallel component voltage VR for power source voltage Vs by subtracting the value of converter AC side current amplitude |Is| multiplied by converter AC side resistance R from an AC power source voltage amplitude |Vs|. That is to say, $VR = |Vs| - R \cdot |Is|$ Then, it obtains a converter voltage reference amplitude |Vc| and a converter voltage reference phase δ following the converter AC side voltage/current vector diagram shown in FIG. 17. That is to say, it obtains converter voltage reference amplitude |Vc| and converter voltage reference phase δ by the following equations using orthogonal and parallel component voltages VL and VR thus obtained.

$|Vc| = (VR^2 = VL^2)^{1/2} \quad \delta = \tan^{-1}(VL/VR)$

As shown in FIG. 18, PWM 1-pulse waveform production unit 113 inputs DC link voltage actual value Vdc, converter voltage reference amplitude |Vc|, converter voltage reference phase δ and power source voltage sine wave phase θs.

It computes a switching angle θ1 for PWM 1-pulse waveform from converter voltage reference amplitude |Vc| and DC link voltage actual value Vdc using the following equation.

$$\theta1=\cos^{-1}(\pi\cdot|Vc|/4\cdot Vdc)$$

When switching is performed with switching angle θ1 obtained by the above equation, the basic frequency component of the PWM 1-pulse waveform output voltage can be made to agree with the converter voltage reference amplitude.

Also, by comparing the value (θs+δ) of converter voltage reference phase a added to power source voltage sine wave phase θs with switching angle θ1, the PWM 1-pulse output voltage waveform is obtained by the following conditional branching. That is to say, as shown in FIG. 19, for U-phase output voltage VuPWM when 0≦(θs+δ)<π−θ1, VuPWM=Vdc/2, when π−θ1≦(θs+δ)<2π−θ1, VuPWM=0, and when 2π−θ1≦(θs+δ)<2π, VuPWM=Vdc/2 is outputted. And for V-phase output voltage VvPWM when 0≦(θs+δ)<θ1, VvPWM=Vdc/2, when θ1≦(θs+δ)<π+θ1, VvPWM=0, and when π+θ1≦(θs+δ)<2π, VvPWM=Vdc/2 is outputted.

These PWM signals VuPWM and VvPWM are applied through gate circuits to respective semiconductor devices GU and GV in converter CON in order to PWM control converter CON. Though not shown in the drawings, PWM signals VxPWM and VyPWM for X and Y phases are generated using PWM signals VuPWM and VvPWM, and are applied through gate circuits to respective semiconductor devices GX and GY, respectively.

The single-phase PWM converter is controlled using the PWM 1-pulse waveform obtained in the above way. That is, when the converter AC side voltage reference is in the vicinity of the sine wave peak, the single-phase PWM converter is controlled such that switching is not performed. By this means, the converter operates in a 1-pulse mode in which only 1 pulse is present in the power source voltage half-cycle. Thus, the 5th and 7th order low frequency components of the basic wave component (50 Hz or 60 Hz) are mostly distributed in the harmonics of the current. Therefore, it becomes a distribution of frequency components in a domain lower than the electromagnetic noise frequency band (1–4 kHz). Thus reduction of noise can be designed.

Figure 20:
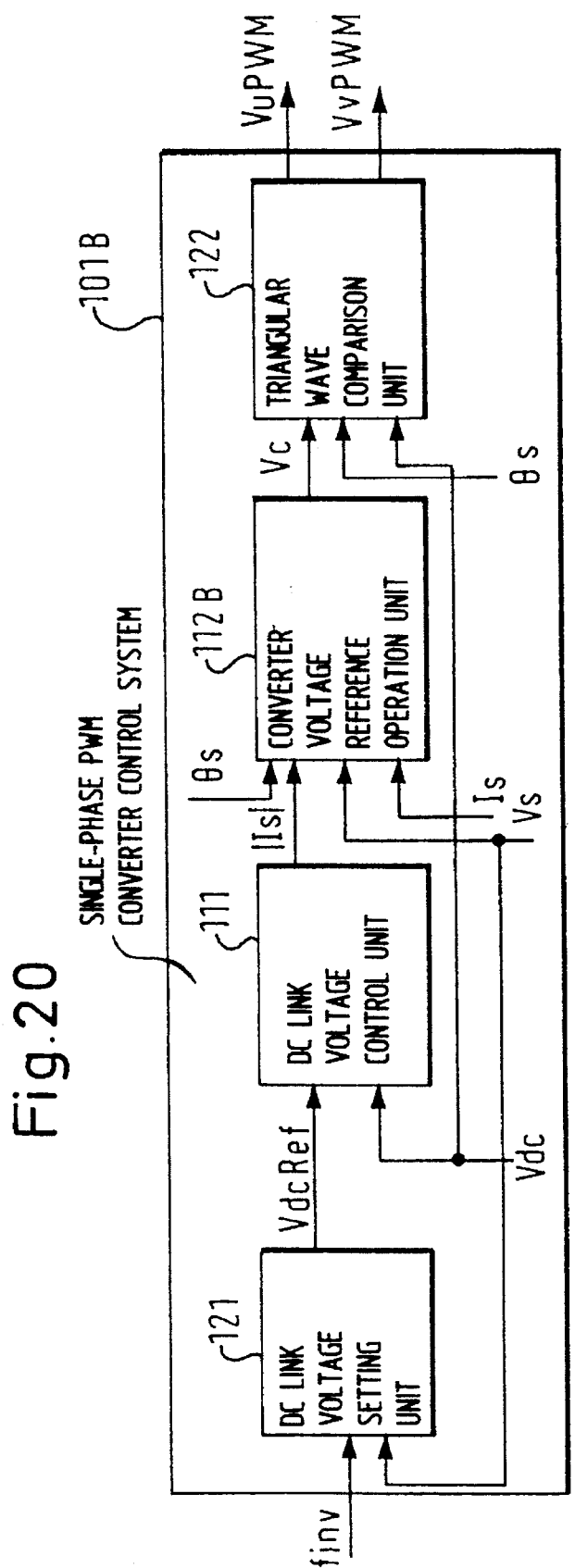
FIG. 20 is a block diagram showing a single-phase PWM converter control system according to a seventh embodiment of this invention.

FIG. 20 is a block diagram showing a single-phase PWM converter control system 101B according to a seventh embodiment of this invention. As shown in FIG. 20, single-phase PWM converter control system 101B is composed of a DC link voltage setting unit 121, DC link voltage control unit 111, a converter voltage reference operation unit 112B and triangular wave comparison unit 122.

Figure 21:
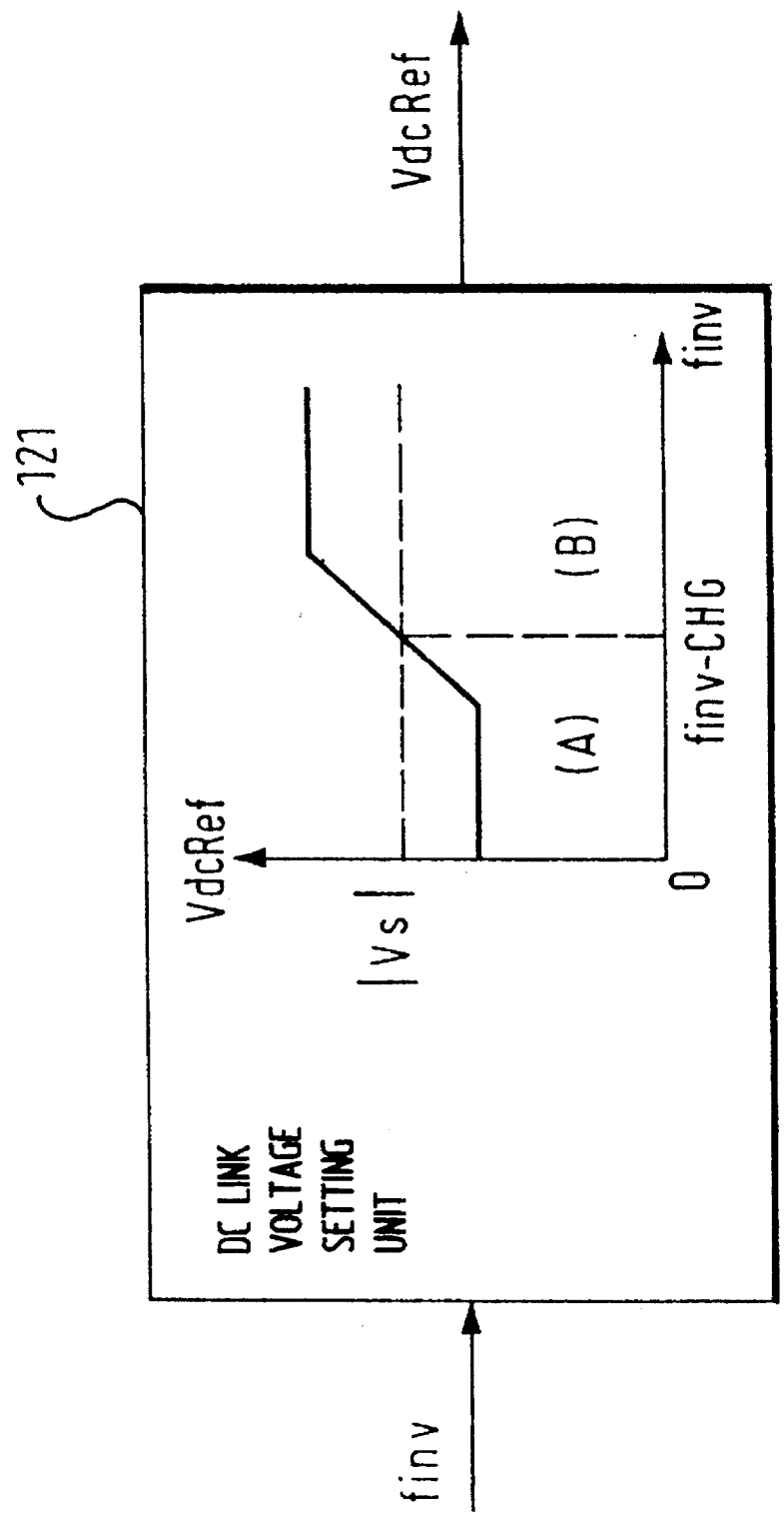
FIG. 21 is a block diagram showing the composition of a DC link voltage setting unit 121.

DC link voltage setting unit 121 outputs DC link voltage reference VdcRef following a predetermined pattern, one example of which is shown in FIG. 21, in response to the magnitude of an output frequency finv of the inverter (not shown) which is connected as a load to the DC side of PWM converter CON.

The feature of this predetermined pattern of this embodiment lies in a region A, where inverter output frequency finv is smaller than a predetermined frequency finv-CHG. In region A, DC link voltage setting unit 121 sets DC link voltage reference VdcRef smaller than PWM converter AC power source voltage amplitude |Vs|. In a region B, where inverter output frequency finv is large than frequency finv-CHG, DC link voltage setting unit 121 sets DC link voltage reference VdcRef larger than PWM converter AC power source voltage amplitude |Vs| as in the prior art.

DC link voltage control unit 111 is the same as that described in the sixth embodiment. Its description has therefore been omitted here.

Figure 22:
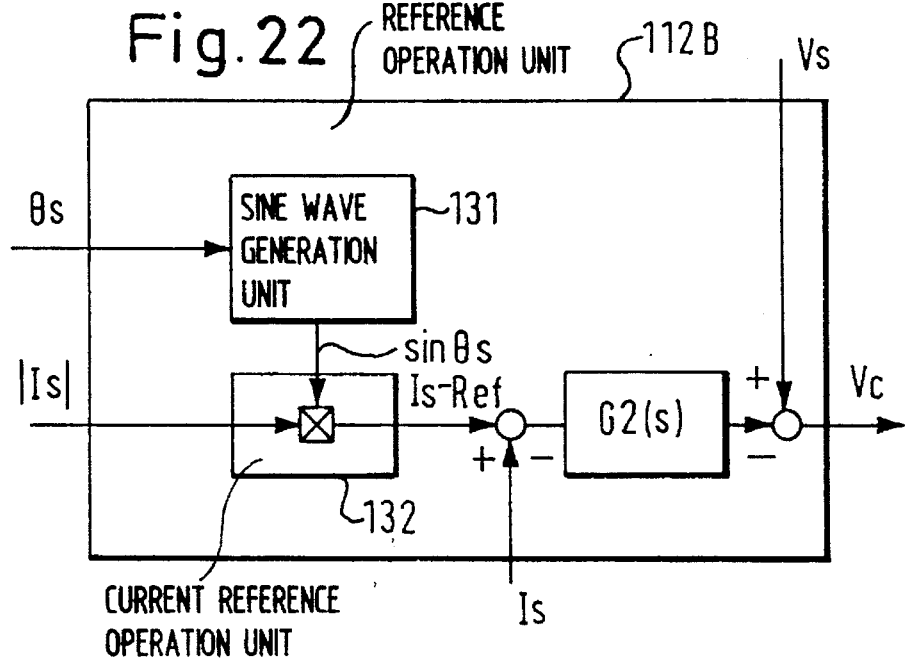
FIG. 22 is a block diagram showing the composition of a converter voltage reference operation unit 112B.

As shown in FIG. 22, converter voltage reference operation unit 112B is composed of a sine wave generation unit 131 and a converter AC side current reference operation unit 132.

Sine wave generation unit 131 takes power source voltage sine wave phase θs as its input, and outputs a sine wave sin(θs) whose amplitude is one, in response to power source voltage sine wave θs.

Current reference operation unit 132 takes converter AC side current amplitude |Is| outputted from DC link voltage control unit 111 and sine wave sin(θs) outputted from sine wave generation unit 131 as inputs. It outputs a converter AC side current reference Is-Ref by the following operation.

Is-Ref=|Is|·sin(θs)

The deviation between converter AC side current reference value Is-Ref and converter AC side current actual value Is is multiplied by a gain G2(s). The value of this product subtracted from AC power source voltage Vs is outputted as converter AC side voltage reference value Vc. That is to say, Vc=Vs−G2(s)×(Is−Ref−Is)

Figure 23:
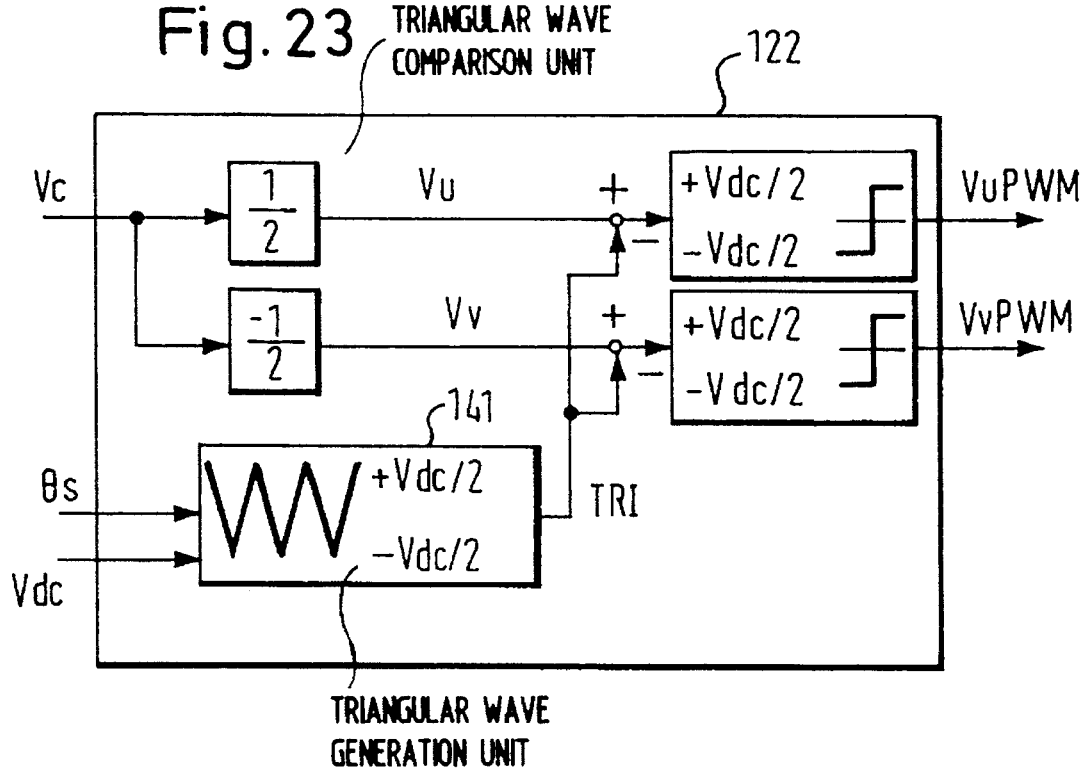
FIG. 23 is a block diagram showing the composition of a triangular wave comparison unit 122.

As shown in FIG. 23, a triangular wave generation unit 141 in triangular wave comparison unit 122 takes DC link voltage actual value Vdc and power source voltage sine wave phase θs as its inputs. It outputs a triangular wave TRI (of amplitude Vdc/2) of a specified frequency which is synchronized with power source voltage sine wave phase θs. Using converter AC side voltage reference value Vc outputted from converter voltage reference operation unit 112B, a U-phase voltage reference Vu and a V-phase voltage reference Vv are obtained by the following operations.

Vu=Vc/2, and

Vv=−Vc/2

PWM voltage signals VuPWM and VvPWM for U-phase and V-phase are obtained by magnitude comparison of respective U-phase and V-phase voltage references Vu and Vv with triangular wave TRI outputted from triangular wave generation unit 141.

Figure 24:
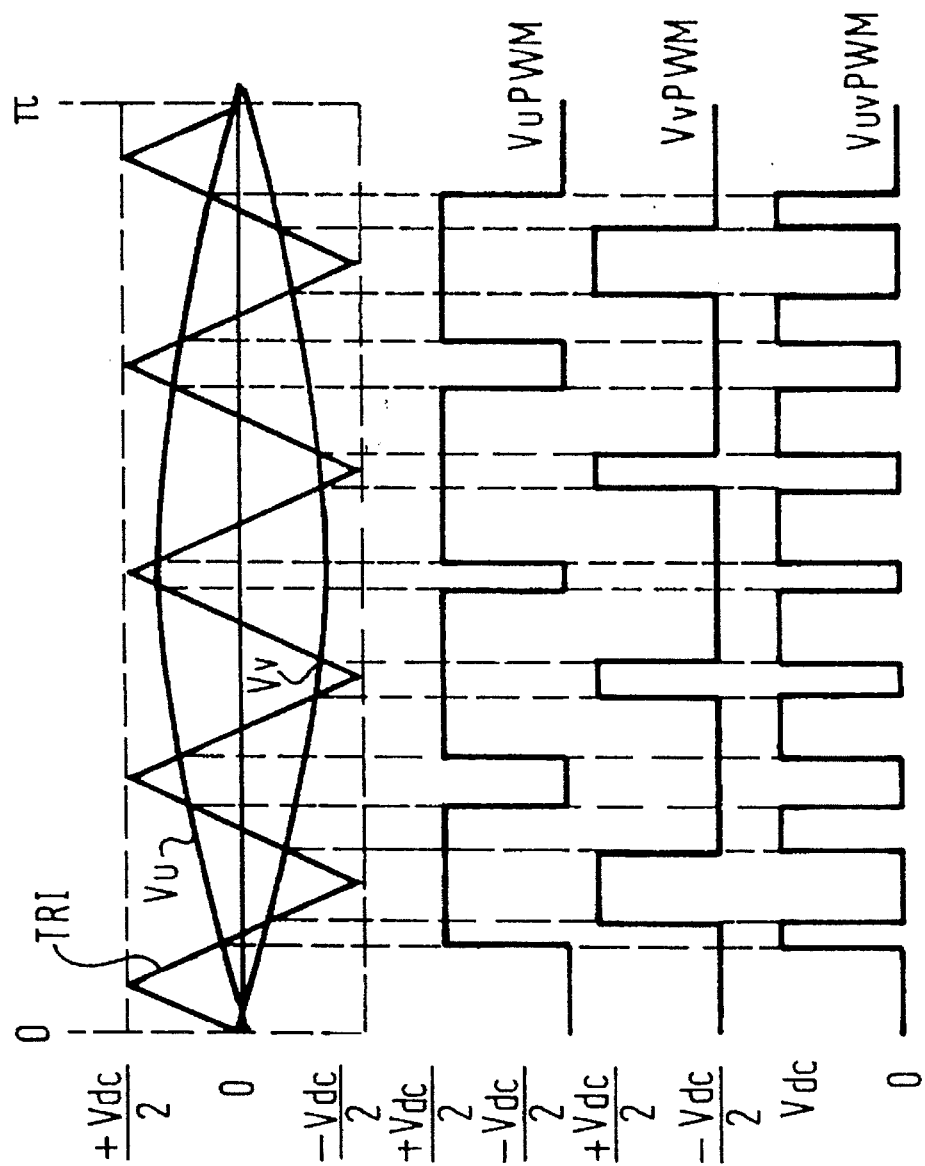
FIG. 24 is a waveform diagram to illustrate the operation of triangular wave comparison unit 122.

That is to say, as shown in FIG. 24, when Vu≧TRI, VuPWM=Vdc/2, when Vu<TRI, VuPWM=−Vdc/2, when Vv≦TRI, VvPWM=Vdc/2, and when Vv<TRI, VvPWM=−Vdc/2

Figure 25A:
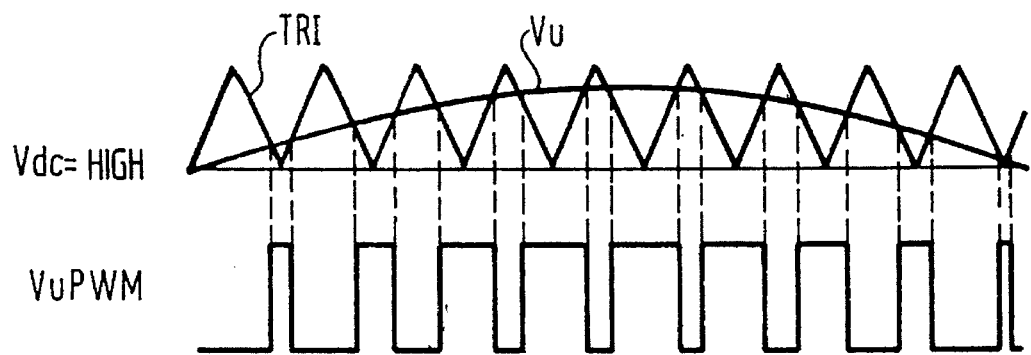
FIG. 25 is a diagram to illustrate the PWM voltage waveform in the seventh embodiment.
Figure 25B:
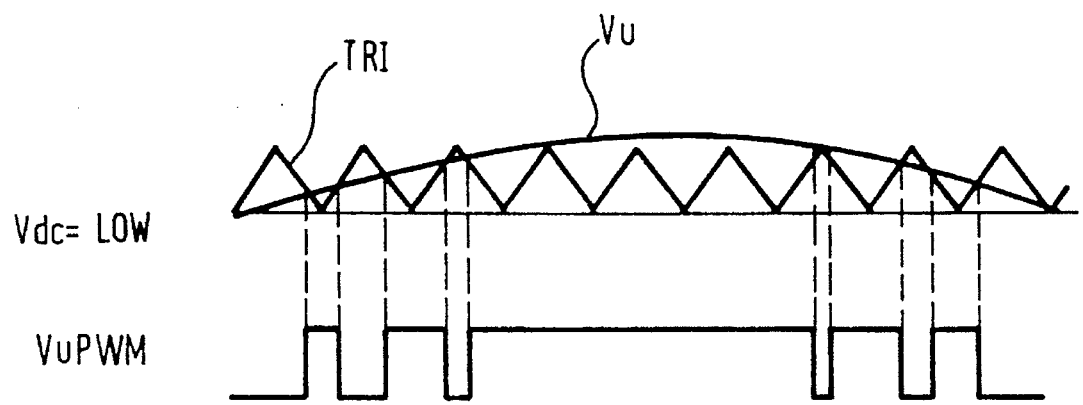

Here, FIG. 25 shows examples of the cases of the PWM output voltages when DC link voltage Vdc is high and when DC link voltage Vdc is low. When DC link voltage Vdc is high, PWM control is executed the same as the conventional PWM control as shown in FIG. 25(a). When DC link voltage Vdc is low, as shown in FIG. 25(b), the number of switchings per power source voltage half-cycle reduces. Therefore, as the single-phase PWM converter is controlled by the PWM 1-pulse waveform, partially, it becomes a distribution of frequency components in a domain lower than the electromagnetic noise frequency band (1–4 kHz). Thus reduction of noise can be designed.

Also, when DC link voltage Vdc is low, the time in which zero voltage is outputted automatically reduces. Thus, the basic frequency component of the output voltage can be set to a high value. Therefore, the DC link voltage can be set to a lower value than a specified value determined from the amplitude of AC power source voltage Vs.

Figure 26:
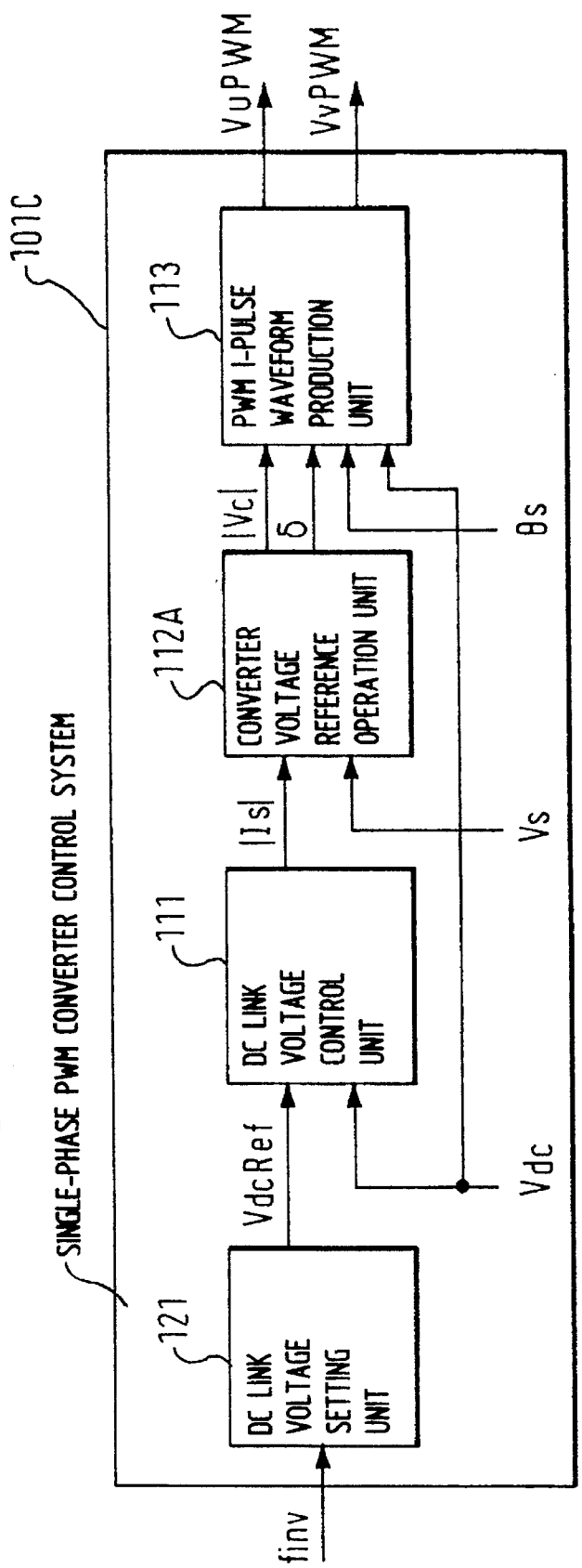
FIG. 26 is a block diagram showing a single-phase PWM converter control system according to an eighth embodiment of this invention.

FIG. 26 is a block diagram showing a single-phase PWM converter control system 101c according to an eighth embodiment of this invention. As shown in FIG. 26, single-phase PWM converter control system 101C of the eighth embodiment is composed of DC link voltage setting unit 121, DC link voltage control unit 111, converter voltage reference operation unit 112A and PWM 1-pulse waveform production unit 113.

DC link voltage setting unit 121 is the same as that described in the seventh embodiment, DC link voltage control unit 111, converter voltage reference operation unit 112A and PWM 1-pulse waveform production unit 113 are the same as those described in the sixth embodiment. Consequently, descriptions of these have been omitted here.

Therefore, even with this type of composition, single-phase PWM converter control system 101C operates using a PWM 1-pulse waveform. Thus, it becomes a distribution of frequency components is a domain lower than the electromagnetic noise frequency band (1–4 kHz), in the same way as the sixth embodiment described above. Therefore, in the case that an inverter is connected as a load to the DC side of PWM converter CON, reduction of noise can be designed.

Figure 27:
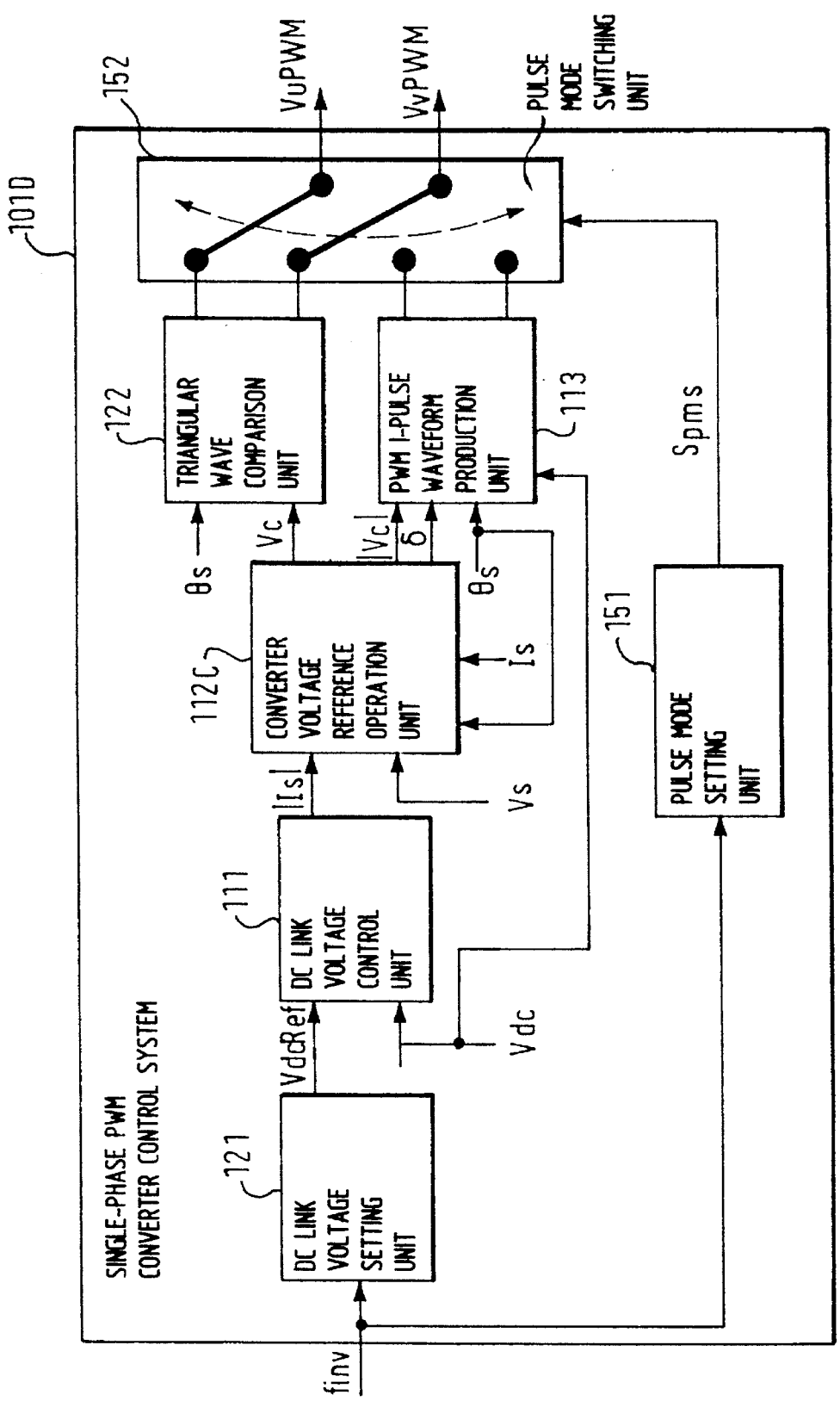
FIG. 27 is a block diagram showing a single-phase PWM converter control system according to a ninth embodiment of this invention.
Figure 28:
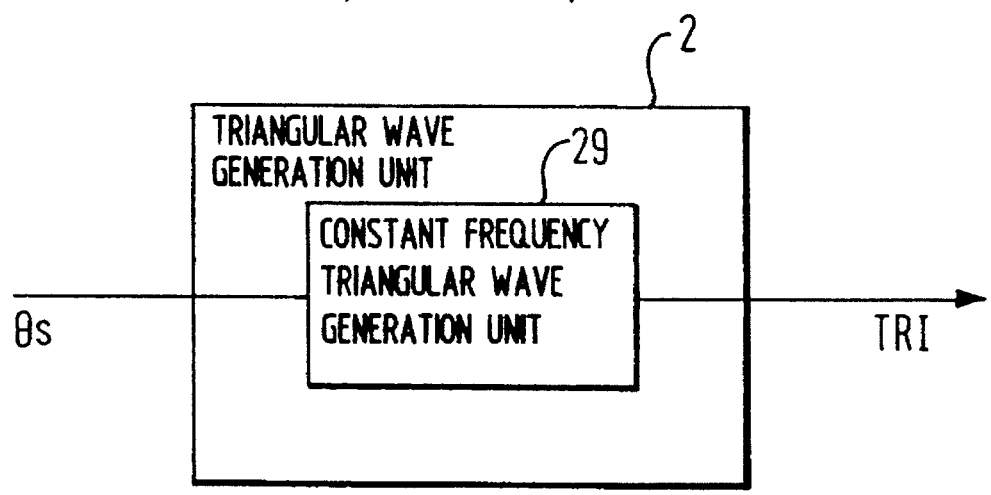
FIG. 28 is a block diagram showing the composition of a triangular wave generation unit 2 in a prior art single-phase PWM converter control system.
Figure 29:
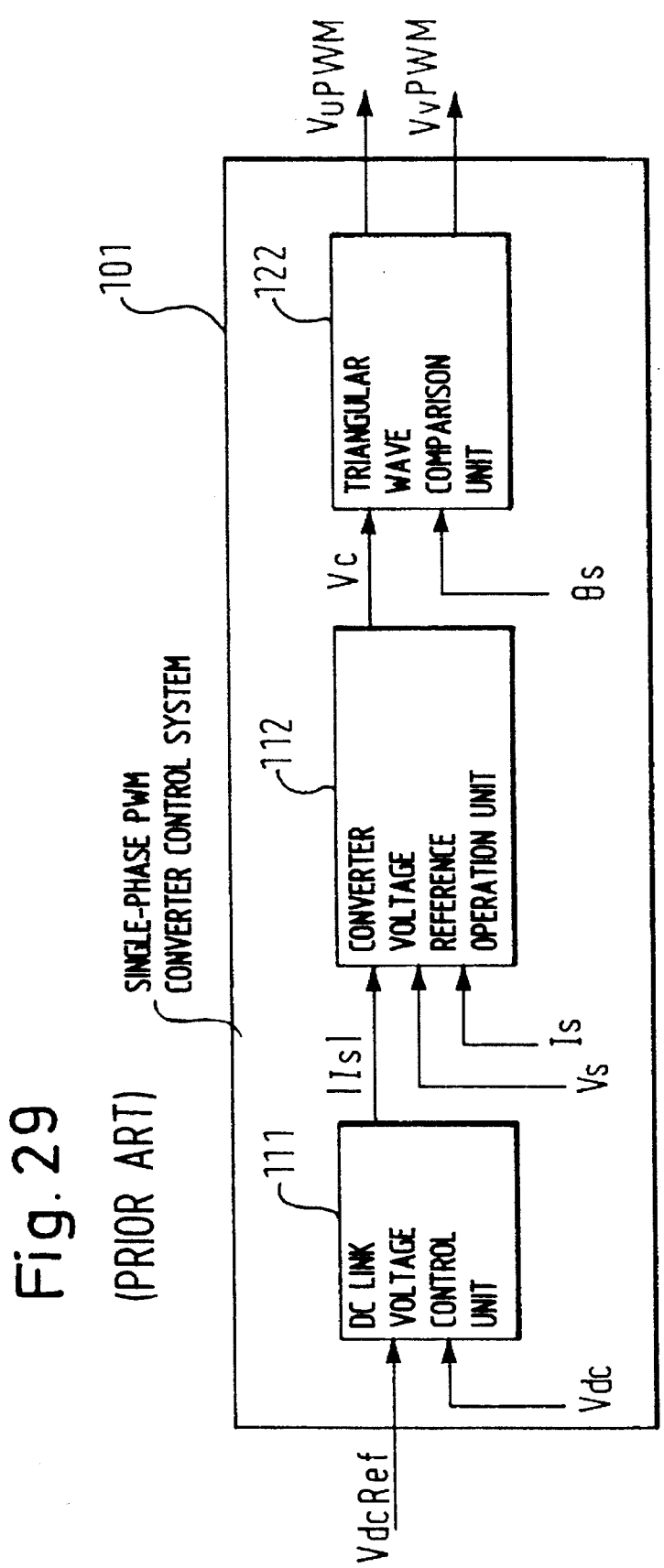
FIG. 29 is a block diagram showing a prior art single-phase PWM converter control system.

FIG. 27 is a block diagram showing a single-phase PWM converter control system 101D according to a ninth embodiment of this invention. As shown in FIG. 27, single-phase PWM converter control system 101D of the ninth embodiment is composed of DC link voltage setting unit 121, DC link voltage control unit 111, a converter voltage reference operation unit 112C, PWM 1-pulse waveform production unit 113, triangular wave comparison unit 122, a pulse mode setting unit 151 and a pulse mode switching unit 152.

The operations of DC link voltage setting unit 121 and triangular wave comparison unit 122 are the same as those described in the seventh embodiment, and their descriptions are omitted here.

Also, DC link voltage control unit 111 and PWM 1-pulse waveform production unit 113 are the same as those described in the sixth embodiment. Thus, their descriptions have been omitted here.

Furthermore, converter voltage reference operation unit 112C is composed of a combination of converter voltage reference operation units 112A and 112B respectively shown in FIGS. 16 and 22. Converter voltage reference operation unit 112C outputs converter voltage reference amplitude |Vc| and converter voltage reference phase δ obtained by the operation circuit shown in FIG. 16 and described in the sixth embodiment, and outputs converter voltage reference value Vc obtained by the operation circuit shown in FIG. 22 and described in the seventh embodiment.

Pulse mode setting unit 151 outputs pulse mode setting signals Ppms in response to the magnitude of output frequency finv of the inverter which is connected to the PWM converter DC side as a load. When inverter output frequency finv is larger or not larger than predetermined frequency finv-CHG, pulse mode setting signal Ppms takes the value 2 or the value 1, respectively. That is to say, when finv<finv-CHG, pulse mode setting signal Spms=1, and when finv≧finv-CHG, pulse mode setting signal Spms=2

Pulse mode switching unit 152 switches to take either the output of triangular wave comparison unit 122 or the output of PWM 1-pulse waveform production unit 113 in response to pulse setting signals Spms outputted in this way.

When pulse mode setting signals Spms is 1, the outputs of PWM 1-pulse waveform production unit 113 are outputted as PWM signals VuPWM and VvPWM for U-phase and V-phase.

When pulse mode setting signal Spms is 2, the outputs of triangular wave comparison unit 122 are outputted as U-phase and V-phase PWM signals VuPWM and VvPWM.

When using a single-phase PWM converter control system with this type of composition, noise reduction can be designed by making the frequency of the inverter connected as a load in a low domain lower than the unpleasant to the ear frequency band (1–4 kHz) of electromagnetic noise.

When using this invention, a single-phase PWM converter control system can be provided which is capable of reducing the PWM converter switching loss without any additions such as current smoothing reactors.

When using the invention as described above, a single-phase PWM converter control system can be provided which is capable of being designed to reduce noise by making the frequency of electromagnetic noise lower than the unpleasant to the ear frequency band (1–4 kHz). Furthermore, it is capable of setting the DC link voltage lower than the specified value determined from the amplitude of the AC power source voltage, thereby to reduce the noise which is unpleasant to the sense of hearing.

Obviously, numerous modifications and variations of the present invention are possible in light of the above teachings. It is therefore to be understood that within the scope of the appended claims, the invention may be practiced otherwise than as specifically described herein.

What is claimed is:

1. A control system for a single-phase PWM converter composed of a plurality of power switching devices which inputs an AC single-phase voltage, converts said AC single-phase voltage to a DC voltage under PWM control and outputs said DC voltage, said control system comprising:

converter voltage reference operation means for inputting a converter DC side voltage actual value, a converter DC side voltage reference value, a converter AC side current actual value, a power source voltage, and a power source voltage sine wave phase and for generating voltage references for respective phases;

triangular wave generation means for inputting said power source voltage sine wave phase and for generating a triangular wave, such that when said power source voltage sine wave phase is in a phase wherein a magnitude of a converter AC side current reference value is small a frequency of said triangular wave is low, and when said power source voltage sine wave phase is in a phase wherein said magnitude of said converter AC side current reference value is large a frequency of said triangular wave is high; and triangular wave comparison means connected to receive said triangular wave and said voltage references for comparing said voltage references and said triangular wave to generate PWM signals for respective phases;

each of said PWM signals being applied to one of said power switching devices in said single-phase PWM converter to PWM control said single-phase PWM converter, respectively.

2. The control system according to claim 1, wherein said triangular wave generation means includes:

high-frequency triangular wave generation means for generating a high-frequency triangular wave in synchronism with said power source voltage sine wave phase;

low-frequency triangular wave generation means for generating a low-frequency triangular wave in synchronism with said power source voltage sine wave phase;

triangular wave frequency setting means for generating a triangular wave setting signal to select one of said high-frequency triangular wave and said low-frequency triangular wave based on said power source voltage sine wave phase; and triangular wave switching means connected to receive said triangular wave setting signal, said high-frequency triangular wave and said low-frequency triangular wave for generating one of said high-frequency triangular wave and said low-frequency triangular wave selected by said triangular wave setting signal as said triangular wave.

3. The control system according to claim 1, wherein said triangular wave generation means includes a triangular wave memory for storing said magnitude of said triangular wave as a function of said power source voltage sine wave phase and generates said triangular wave in synchronism with an AC power source voltage based on said power source voltage sine wave phase.

4. A control system for a single-phase PWM converter composed of a plurality of single-phase PWM unit converters, each of said single-phase PWM unit converters being composed of a plurality of power switching devices which inputs an AC single-phase voltage through a transformer, converts said AC single-phase voltage to a DC voltage under PWM control and outputs said DC voltage, said control system comprising:

a plurality of unit control systems provided for controlling respective one of said single-phase PWM unit converters;

each of said unit control system including, converter voltage reference operation means for inputting a converter DC side voltage actual value, a converter DC side voltage reference value, a converter AC side current actual value, a power source voltage, and a power source voltage sine wave phase and for generating voltage references for respective phases;

triangular wave generation means for inputting said power source voltage sine wave phase and for generating a triangular wave, such that when said power source voltage sine wave phase is in a phase wherein a magnitude of a converter AC side current reference value is small a frequency of said triangular wave is low, and when said power source voltage sine wave phase is in a phase wherein said magnitude of said converter AC side current reference value is large a frequency of said triangular wave is high; and triangular wave comparison means connected to receive said triangular wave and said voltage references for comparing said voltage references and said triangular wave to generate PWM signals for respective phases;

each of said PWM signals being applied to one of said power switching devices in said single-phase PWM unit converter to PWM control said single-phase PWM unit converter, respectively;

each of said triangular wave generated by said triangular wave generation means being shifted in its phase each other.

5. A control system for a single-phase PWM converter composed of a plurality of power switching devices which inputs an AC single-phase voltage, converts said AC single-phase voltage to a DC voltage under PWM control and outputs said DC voltage, said control system comprising:

converter voltage reference operation means for inputting a converter DC side voltage actual value, a converter DC side voltage reference value, a converter AC side current actual value, a power source voltage, and a power source voltage sine wave phase and for generating voltage references for respective phases and a converter AC side current reference value;

triangular wave generation means connected to receive said power source voltage sine wave phase and said converter AC side current reference value for generating a triangular wave, such that when a magnitude of said converter AC side current reference value is small a frequency of said triangular wave is low, and when said magnitude of said converter AC side current reference value is large a frequency of said triangular wave is high; and triangular wave comparison means connected to receive said triangular wave and said voltage references for comparing said voltage references and said triangular wave to generate PWM signals for respective phases;

each of said PWM signals being applied to one of said power switching devices in said single-phase PWM converter to PWM control said single-phase PWM converter, respectively.

6. The control system according to claim 5, wherein said triangular wave generation means includes:

high-frequency triangular wave generation means for generating a high-frequency triangular wave in synchronism with said power source voltage sine wave phase;

low-frequency triangular wave generation means for generating a low-frequency triangular wave in synchronism with said power source voltage sine wave phase;

triangular wave frequency setting means for generating a triangular wave setting signal to select one of said high-frequency triangular wave and said low-frequency triangular wave based on said converter AC side current reference value; and triangular wave switching means connected to receive said triangular wave setting signal, said high-frequency triangular wave and said low-frequency triangular wave for generating one of said high-frequency triangular wave and said low-frequency triangular wave selected by said triangular wave setting signal as said triangular wave.

7. A control system for a single-phase PWM converter composed of a plurality of power switching devices which inputs an AC single-phase voltage, converts said AC single-phase voltage to a DC voltage under PWM control and outputs said DC voltage, said control system comprising:

converter voltage reference operation means for inputting a converter DC side voltage actual value, a converter DC side voltage reference value, a converter AC side current actual value, a power source voltage, and a power source voltage sine wave phase and for generating voltage references for respective phases;

triangular wave generation means for inputting said power source voltage sine wave phase and for generating a triangular wave of a constant frequency in synchronism with said power source voltage sine wave phase;

voltage reference correction means connected to receive said voltage references and said power source voltage sine wave phase for correcting said voltage references based on said power source voltage sine wave phase to generate as voltage reference corrected values for respective phases; and triangular wave comparison means connected to receive said triangular wave and said voltage reference corrected values for comparing said voltage reference corrected values and said triangular wave to generate PWM signals for respective phases;

each of said PWM signals being applied to one of said power switching devices in said single-phase PWM converter to PWM control said single-phase PWM converter, respectively.

8. A control system for a single-phase PWM converter composed of a plurality of power switching devices which inputs an AC single-phase voltage, converts said AC single-phase voltage to a DC voltage under PWM control and outputs said DC voltage, said control system comprising:

DC link voltage control means for inputting a DC link voltage actual value of a DC side of said single-phase PWM converter and a DC link voltage reference value previously set, for generating a first amplitude of a current at an AC side of said single-phase PWM converter so that a deviation between said DC link voltage actual value and said DC link voltage reference value becomes small;

converter voltage reference operation means connected to receive said first amplitude and said AC single-phase voltage for generating a converter voltage reference based on said first amplitude and said AC single-phase voltage, said converter voltage reference including a second amplitude of said converter voltage reference and a phase of said converter voltage reference which is a phase difference between said converter voltage reference and said AC single-phase voltage; and PWM one-pulse waveform production means connected to receive said converter voltage reference, said DC link voltage actual value and a sine wave phase of said AC single-phase voltage for generating PWM signals for respective phases of a PWM one-pulse waveform synchronized with said phase of said converter voltage reference;

said PWM one-pulse waveform including one pulse of each of said PWM signals in a half-cycle of said AC single-phase voltage;

each of said PWM signals being provided with a third amplitude of a basic frequency component of said PWM signal equal to said second amplitude; and each of said PWM signals being applied to one of said power switching devices in said single-phase PWM converter to PWM control said single-phase PWM converter, respectively.

9. A control system for a single-phase PWM converter composed of a plurality of power switching devices which inputs an AC single-phase voltage, converts said AC single-phase voltage to a DC voltage under PWM control, outputs said DC voltage, and an inverter is connected to said DC side of said single-phase PWM converter as a load, said control system comprising:

DC link voltage setting means for inputting an output frequency of said inverter and a fourth amplitude of said AC single-phase voltage and for generating said DC link voltage reference value, such that when said output frequency is small said DC link voltage reference value is smaller than said fourth amplitude, and when said output frequency is large said DC link voltage reference value is larger than said fourth amplitude;

DC link voltage control means connected to receive said DC link voltage reference value and a DC link voltage actual value for generating a first amplitude of a current at an AC side of said single-phase PWM converter so that a deviation between said DC link voltage actual value and said DC link voltage reference value becomes small;

converter voltage reference operation means connected to receive said first amplitude, said AC single-phase voltage, a sine wave phase of said AC single-phase voltage, and an actual value of a current at an input side of said single-phase PWM converter for generating a converter voltage reference; and triangular wave comparison means connected to receive said converter voltage reference, said DC link voltage actual value and said sine wave phase of said AC single-phase voltage for comparing said converter voltage reference and a triangular wave of a constant frequency synchronized with said sine wave phase, having an amplitude determined by said DC link voltage actual value to generate PWM signals for respective phases;

each of said PWM signals being applied to one of said power switching devices in said single-phase PWM converter to PWM control said single-phase PWM converter, respectively.

10. The control system according to claim 8, wherein an inverter is connected to said DC side of said single-phase PWM converter as a load;

further comprising DC link voltage setting means for inputting an output frequency of said inverter and a fourth amplitude of said AC single-phase voltage and for generating said DC link voltage reference value, such that when said output frequency is small said DC link voltage reference value is smaller than said fourth amplitude, and when said output frequency is large said DC link voltage reference value is larger than said fourth amplitude; and wherein said DC link voltage reference value thus generated is applied to said DC link voltage control means.

11. A control system for a single-phase PWM converter composed of a plurality of power switching devices which inputs an AC single-phase voltage, converts said AC single-phase voltage to a DC voltage under PWM control, outputs said DC voltage, and an inverter is connected to said DC side of said single-phase PWM converter as a load, said control system comprising:

DC link voltage setting means for inputting an output frequency of said inverter and a fourth amplitude of said AC single-phase voltage and for generating said DC link voltage reference value, such that when said output frequency is small said DC link voltage reference value is smaller than said fourth amplitude, and when said output frequency is large said DC link voltage reference value is larger than said fourth amplitude;

DC link voltage control means connected to receive said DC link voltage reference value and a DC link voltage actual value for generating a first amplitude of a current at an AC side of said single-phase PWM converter so that a deviation between said DC link voltage actual value and said DC link voltage reference value becomes small;

converter voltage reference operation means connected to receive said first amplitude, said AC single-phase voltage, a sine wave phase of said AC single-phase voltage, and an actual value of a current at an input side of said single-phase PWM converter for generating a first converter voltage reference based on said first amplitude and said AC single-phase voltage, said converter voltage reference including a second amplitude of said converter voltage reference and a phase of said converter voltage reference which is a phase difference between said converter voltage reference and said AC single-phase voltage and for generating a second converter voltage reference based on said first amplitude, said AC single-phase voltage, said sine wave phase of said AC single-phase voltage, and said actual value of said current at said input side of said single-phase PWM converter; and PWM one-pulse waveform production means connected to receive said first converter voltage reference, said DC link voltage actual value and said sine wave phase of said AC single-phase voltage for generating first PWM signals for respective phases of a PWM one-pulse waveform synchronized with said phase of said first converter voltage reference;

said PWM one-pulse waveform including one pulse of each of said first PWM signals in a half-cycle of said AC single-phase voltage;

each of said first PWM signals being provided with a third amplitude of a basic frequency component of said first PWM signal equal to said second amplitude;

triangular wave comparison means connected to receive said second converter voltage reference, said DC link voltage actual value and said sine wave phase of said AC single-phase voltage for comparing said second converter voltage reference and a triangular wave of a constant frequency synchronized with said sine wave phase, having amplitude determined by said DC link voltage actual value to generate second PWM signals for respective phases;

pulse mode setting means connected to receive said inverter output frequency for generating a first pulse mode setting signal indicating said PWM one-pulse mode when said inverter output requency is low and for generating a second pulse mode setting signal indicating a triangular wave comparison mode when said inverter output frequency is high; and pulse mode selection means connected to receive said first and second pulse mode setting signals and said first and second PWM signals for generating said first PWM signals when said first pulse mode setting signal is inputted and for generating said second PWM signals when said second pulse mode setting signal is inputted and for outputting said first and second PWM signals as PWM signals for respective phases;

each of said PWM signals being applied to one of said power switching devices in said single-phase PWM converter to PWM control said single-phase PWM converter, respectively.

\* \* \* \* \*